US012737893B2

(12) United States Patent
Yoshida

(10) Patent No.: US 12,737,893 B2

(45) Date of Patent: Sep. 15, 2026

(54) TRACKING DEVICE, TRACKING METHOD, AND RECORDING MEDIUM

(71) Applicant: NEC Corporation, Tokyo (JP)

(72) Inventor: Noboru Yoshida, Tokyo (JP)

(73) Assignee: NEC Corporation, Minato-ku (JP)

( * ) Notice: Subject to any disclaimer, the term of this patent is extended or adjusted under 35 U.S.C. 154(b) by 456 days.

(21) Appl. No.: 17/928,375

(22) PCT Filed: Jun. 1, 2020

(86) PCT No.: PCT/JP2020/021602

§ 371 (c)(1),
(2) Date: Nov. 29, 2022

(87) PCT Pub. No.: WO2021/245747

PCT Pub. Date: Dec. 9, 2021

(65) Prior Publication Data

US 2023/0215015 A1 Jul. 6, 2023

(51) Int. Cl.
*G06T 7/20* (2017.01)
*G06T 7/246* (2017.01)
(Continued)

(52) U.S. Cl.
CPC ................ *G06T 7/20* (2013.01); *G06V 20/46* (2022.01); *G06V 20/52* (2022.01); *G06T 7/248* (2017.01);
(Continued)

(58) Field of Classification Search
CPC ................... G06T 7/20; G06T 2200/24; G06T 2207/30196; G06T 7/248; G06V 20/46; G06V 20/52
See application file for complete search history.

(56) References Cited

U.S. PATENT DOCUMENTS 11,295,457 B2 * 4/2022 Semitsu .................... G06T 7/97

FOREIGN PATENT DOCUMENTS

JP 2006-059038 A 3/2006
JP 2008-259161 A 10/2008
(Continued)

OTHER PUBLICATIONS

International Search Report for PCT Application No. PCT/JP2020/021602, mailed on Sep. 1, 2020.
(Continued)

*Primary Examiner* — Emily C Terrell
*Assistant Examiner* — Daniella M. DiGuglielmo
(74) *Attorney, Agent, or Firm* — Sughrue Mion, PLLC

(57) ABSTRACT

A tracking device that includes a tracking unit that extracts image frames from video data based on a time threshold value that is a reference for extracting the image frames to be collated with a verification frame that is a verification target, detects a tracking target in the image frames, and sets a collation range for the tracking target based on a space threshold value that is a reference of the collation range for the tracking target, a display information generation unit that generates display information including a tracking image in which the collation range is associated with the tracking target in the image frames and an operation image for setting the time threshold value and the space threshold value, and a threshold value update unit that updates the space threshold value and the time threshold value with values set by the user who refers to the display information.

20 Claims, 23 Drawing Sheets

(51) Int. Cl.
*G06V 20/40* (2022.01)
*G06V 20/52* (2022.01)

(52) U.S. Cl.
CPC ............................... *G06T 2200/24* (2013.01); *G06T 2207/30196* (2013.01)

(56) References Cited

FOREIGN PATENT DOCUMENTS

| | | | | | |
|---|---|---|---|---|---|
| JP | 2010-257451 | | | 11/2010 | |
| JP | 2010257451 | A | * | 11/2010 | |
| JP | 2015053032 | A | * | 3/2015 | ......... G06K 9/00288 |
| JP | 2016-201758 | A | | 12/2016 | |
| JP | 2018-517984 | A | | 7/2018 | |
| WO | 2013/108686 | A1 | | 7/2013 | |
| WO | WO-2014083910 | A1 | * | 6/2014 | ............. G06T 7/208 |
| WO | WO-2015098442 | A1 | * | 7/2015 | ............. G06T 7/215 |

OTHER PUBLICATIONS

English translation of Written opinion for PCT Application No. PCT/JP2020/021602, mailed on Sep. 1, 2020.

JP Office Action for JP Application No. 2022-529147, mailed on Jul. 11, 2023 with English Translation.

* cited by examiner 1
10
TRACKING DEVICE
11
VIDEO ACQUISITION UNIT
12
VIDEO STORAGE UNIT
13
TRACKING UNIT
14
DISPLAY INFORMATION GENERATION UNIT
15
DISPLAY INFORMATION OUTPUT UNIT
16
THRESHOLD VALUE UPDATE UNIT
110
SURVEILLANCE CAMERA
120
TERMINAL DEVICE 130
140
141
142
150

130
150
140
141
SPACE THRESHOLD VALUE
161
0.01
1
2
T
ID : 01
142
TIME THRESHOLD VALUE
162
1
10
100
FRAME # t+10

130
150
140
141
SPACE THRESHOLD VALUE
161
0.01
1
2
142
TIME THRESHOLD VALUE
162
1
10
100
T
ID : 01
FRAME # t+20

130
140
141
SPACE THRESHOLD VALUE
161
0.01
0.5
2
142
TIME THRESHOLD VALUE
162
1
10
100
150
B
C
D
A
ID : 12
ID : 13
ID : 14
ID : 11

130
140
141
SPACE THRESHOLD VALUE
161
0.01
1
2
142
TIME THRESHOLD VALUE
162
1
10
100
150
A
B
C
D
ID : 11
ID : 12
ID : 13
ID : 14

130
150
140
141
SPACE THRESHOLD VALUE
161
0.01
2
142
TIME THRESHOLD VALUE
162
1
10
100
D
C
B
A
165
ID : 11

130
140
141
SPACE THRESHOLD VALUE
161
0.01
1
2
142
TIME THRESHOLD VALUE
162
1
10
100
150
E
ID : 31
FRAME # t 130
150
140
141
SPACE THRESHOLD VALUE
161
0.01
2
E
142
TIME THRESHOLD VALUE
162
1
10
100
ID : 31
FRAME # t 130
150
140
141
SPACE THRESHOLD VALUE
161
0.01
2
E
ID : 31
142
TIME THRESHOLD VALUE
162
1
10
100
FRAME # t+10

130
150
140
141
SPACE THRESHOLD VALUE
161
0.01
1
2
142
TIME THRESHOLD VALUE
162
1
10
100
G
ID : 42
F
ID : 41
FRAME # t 130
140
141
SPACE THRESHOLD VALUE
161
0.01
1
2
142
TIME THRESHOLD VALUE
162
1
20
100
150
G
ID : 42
F
ID : 41
FRAME # t 130
140
141
SPACE THRESHOLD VALUE
161
0.01
1
2
145
142
TIME THRESHOLD VALUE
162
1
10
100
150
FRAME # t
FRAME # t−10

Fig.22

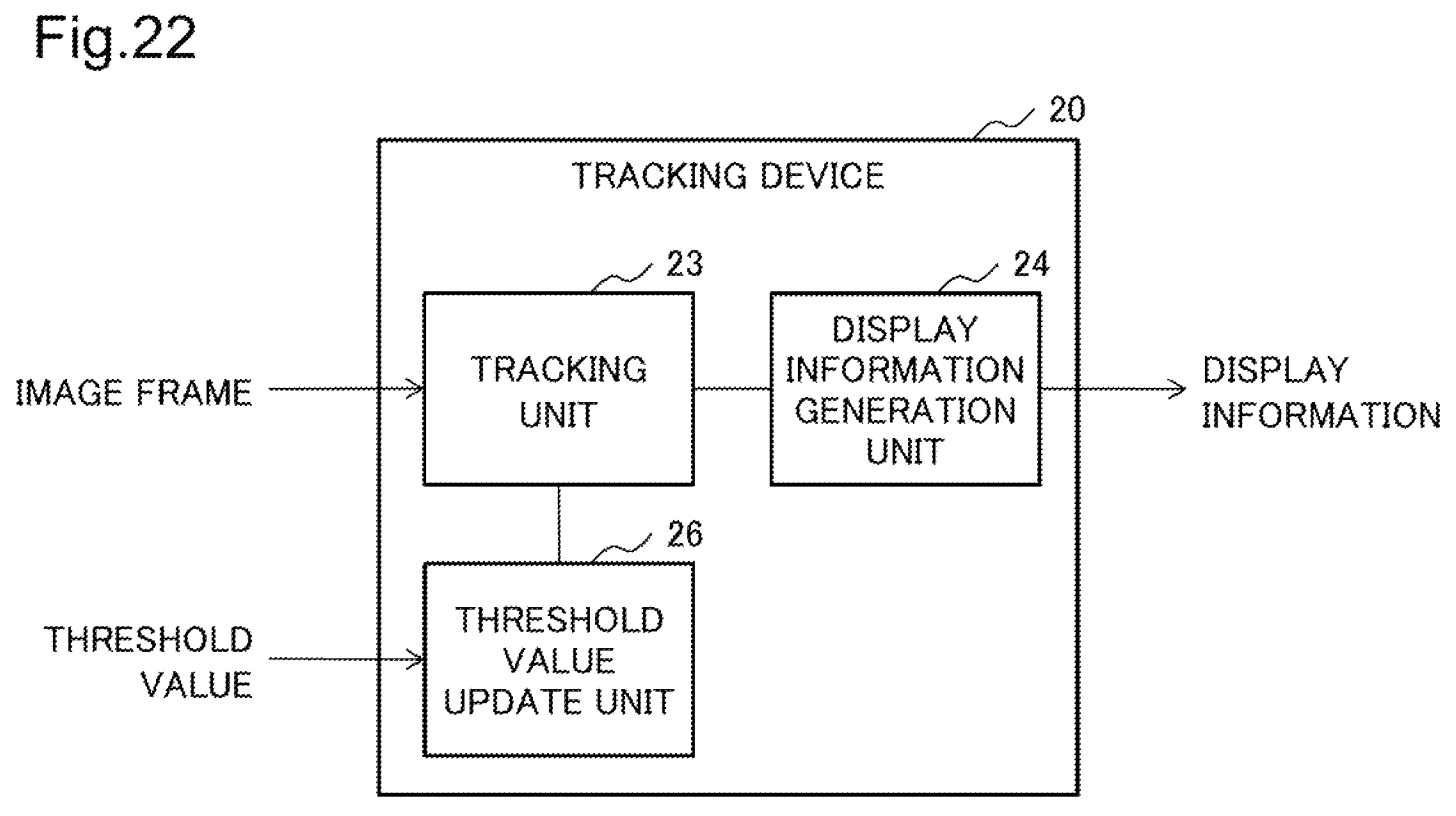

IMAGE FRAME

THRESHOLD VALUE

20

TRACKING DEVICE

23

TRACKING UNIT

24

DISPLAY INFORMATION GENERATION UNIT

26

THRESHOLD VALUE UPDATE UNIT

DISPLAY INFORMATION

TRACKING DEVICE, TRACKING METHOD, AND RECORDING MEDIUM

This application is a National Stage Entry of PCT/JP2020/021602 filed on Jun. 1, 2020, the contents of all of which are incorporated herein by reference, in their entirety.

TECHNICAL FIELD

The present invention relates to a tracking device and the like that track a tracking target.

BACKGROUND ART

The person tracking technique is a technique for detecting a person from individual image frames constituting a moving image captured by a surveillance camera and tracking the detected person. In the person tracking technique, for example, individual persons having been detected are identified by face authentication or the like, an identification number is assigned, and a person assigned with the identification number is tracked in consecutive image frames. In a general person tracking technique, when there is an image frame at a time point when a person being tracked (also referred to as tracking target person) intersects another person or a shielding object, the tracking target person has sometimes been swapped in an image frame at a later time point, or the tracking target person has been sometimes detected as a new person.

PTL 1 discloses a setting device that dynamically sets a frequency of determining whether an object in a moving image is a predetermined object. When it is determined that the object in the moving image is the predetermined object, the device of PTL 1 sets the frequency of determination to be lower than before.

CITATION LIST

Patent Literature

[PTL 1] JP 2015-053032 A

SUMMARY OF INVENTION

Technical Problem

According to the method of PTL 1, by dynamically changing the frequency of determining whether an object in a moving image is a predetermined object on the basis of a rule designated in advance, it is possible to accurately determine whether the object in the moving image is the predetermined object. However, in the method of PTL 1, since the frequency of determining whether the object in the moving image is the predetermined object is switched on the basis of a rule designated in advance, there has sometimes been a change that does not match the need of a user who monitors through the moving image.

An object of the present invention is to provide a tracking device and the like that enables tracking of a tracking target in accordance with the need of a user.

Solution to Problem

A tracking device of an aspect of the present invention includes: a tracking unit that extracts, from video data including a plurality of image frames, the image frames based on a time threshold value that is a reference for extracting the image frames to be collated with a verification frame that is a verification target, detects a tracking target in the image frames that are extracted, and sets a collation range for the tracking target based on a space threshold value that is a reference of the collation range for the tracking target; a display information generation unit that generates display information including a tracking image in which the collation range is associated with the tracking target in the image frames and an operation image for setting the time threshold value and the space threshold value; and a threshold value update unit that acquires values of the time threshold value and the space threshold value that are set by a user who refers to the display information, and updates the space threshold value and the time threshold value with the values set by the user.

In a tracking method of an aspect of the present invention, a computer extracts, from video data including a plurality of image frames, the image frames based on a time threshold value that is a reference for extracting the image frames to be collated with a verification frame that is a verification target, detects a tracking target in the image frames that are extracted, sets a collation range for the tracking target based on a space threshold value that is a reference of the collation range for the tracking target, generates display information including a tracking image in which the collation range is associated with the tracking target in the image frames and an operation image for setting the time threshold value and the space threshold value, acquires values of the time threshold value and the space threshold value that are set by a user who refers to the display information, and updates the space threshold value and the time threshold value with the values set by the user.

A program of an aspect of the present invention causes a computer to execute processing of extracting, from video data including a plurality of image frames, the image frames based on a time threshold value that is a reference for extracting the image frames to be collated with a verification frame that is a verification target, processing of detecting a tracking target in the image frames that are extracted, processing of setting a collation range for the tracking target based on a space threshold value that is a reference of the collation range for the tracking target, processing of generating display information including a tracking image in which the collation range is associated with the tracking target in the image frames and an operation image for setting the time threshold value and the space threshold value, processing of acquiring values of the time threshold value and the space threshold value that are set by a user who refers to the display information, and processing of updating the space threshold value and the time threshold value with the values set by the user.

Advantageous Effects of Invention

According to the present invention, it becomes possible to provide a tracking device and the like capable of tracking a tracking target in accordance with the need of a user.

BRIEF DESCRIPTION OF DRAWINGS

FIG. 22 is a block diagram illustrating an example of a configuration of a tracking device according to a second example embodiment.

EXAMPLE EMBODIMENT

Figure 1:
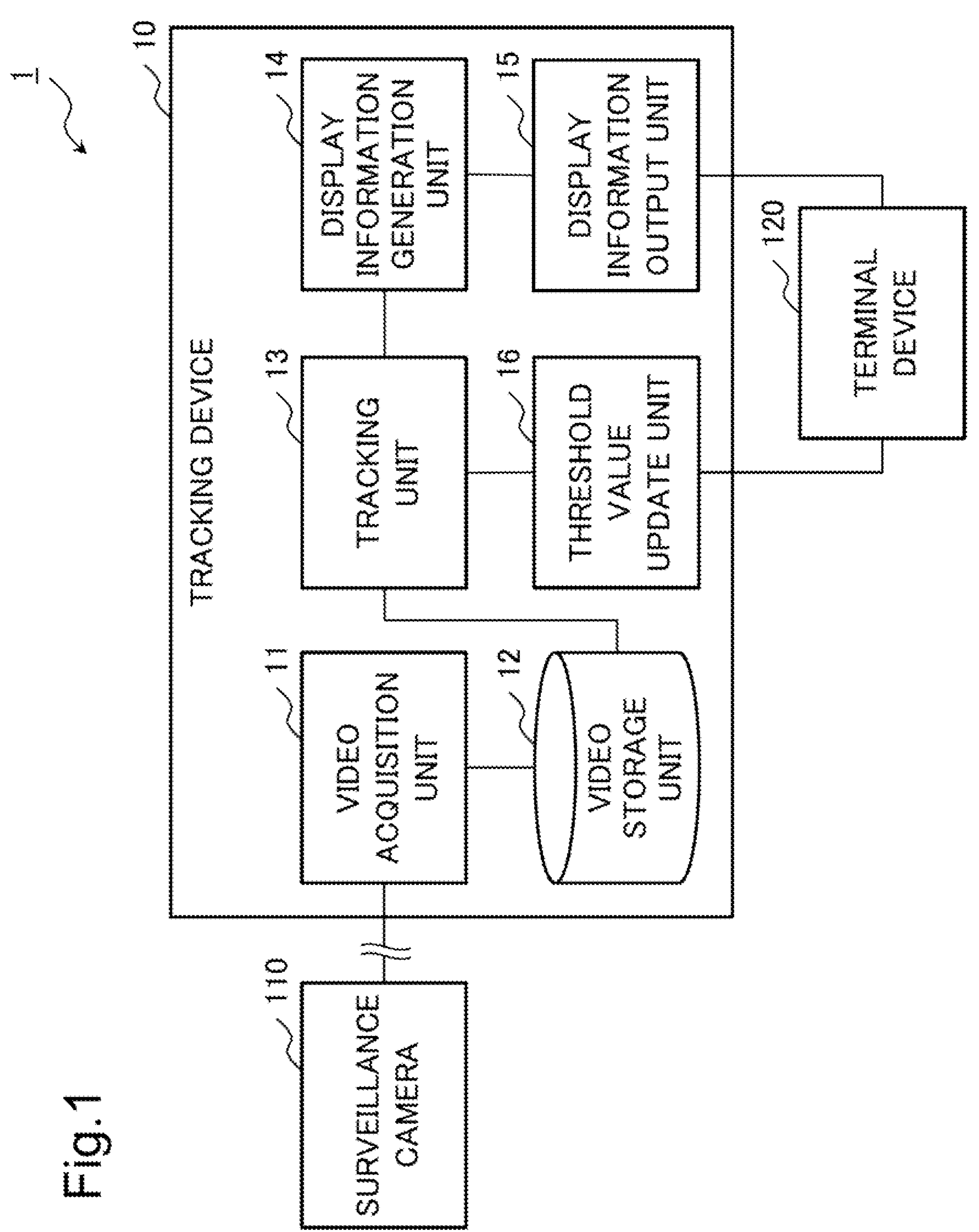
FIG. 1 is a block diagram illustrating an example of a configuration of a tracking system according to a first example embodiment.

Example embodiments for carrying out the present invention will be described below with reference to the drawings. However, the example embodiments described below have technically desirable limitations for carrying out the present invention, but the scope of the invention is not limited to the following. In all the drawings used in the description of the example embodiments below, similar parts are given the same reference signs unless there is a particular reason. In the following example embodiments, repeated description regarding similar configurations and operations may be omitted. The orientations of the arrows in the drawings illustrate examples, and do not limit the orientations of signals and the like between blocks.

First Example Embodiment

First, the tracking device according to the first example embodiment will be described with reference to the drawings. The tracking device of the present example embodiment detects a tracking target such as a person from an image (also referred to as image frame) constituting a moving image captured by a surveillance camera or the like, and tracks the detected tracking target. The tracking target of the tracking device of the present example embodiment is not particularly limited. For example, the tracking device of the present example embodiment may track not only a person but also an animal such as a dog or a cat, a mobile object such as an automobile, a bicycle, and a robot, a discretionary object, and the like.

(Configuration)

FIG. 1 is a block diagram illustrating an example of the configuration of a tracking system 1 according to the present example embodiment. The tracking system 1 includes a tracking device 10, a surveillance camera 110, and a terminal device 120. Although only one surveillance camera 110 and one terminal device 120 are illustrated in FIG. 1, a plurality of surveillance cameras 110 and a plurality of terminal devices 120 may be provided.

The surveillance camera 110 is disposed at a position where a surveillance target range can be captured. The surveillance camera 110 has a function of a general surveillance camera. The surveillance camera 110 may be a camera sensitive to a visible region or an infrared camera sensitive to an infrared region. For example, the surveillance camera 110 is disposed on a street or in a room where many people are present. A connection method between the surveillance camera 110 and the tracking device 10 is not particularly limited. For example, the surveillance camera 110 is connected to the tracking device 10 via a network such as the Internet or an intranet.

The surveillance camera 110 captures the surveillance target range at a set capture interval, and generates video data. The surveillance camera 110 outputs the generated video data to the tracking device 10. The video data includes a plurality of pieces of image data (also referred to as image frames) captured at set capture intervals. The timing at which the surveillance camera 110 outputs data to the tracking device 10 is not particularly limited. For example, the surveillance camera 110 may output video data including a plurality of image frames to the tracking device 10, or may output each of the plurality of image frames to the tracking device 10 in chronological order of capture.

The tracking device 10 includes a video acquisition unit 11, a video storage unit 12, a tracking unit 13, a display information generation unit 14, a display information output unit 15, and a threshold value update unit 16. For example, the tracking device 10 is disposed on a server or a cloud. For example, the tracking device 10 may be provided as an application installed in the terminal device 120.

The video acquisition unit 11 acquires, from the surveillance camera 110, processing target video data. The video acquisition unit 11 stores the acquired video data in the video storage unit 12. The timing at which the tracking device 10 acquires data from the surveillance camera 110 is not particularly limited. For example, the video acquisition unit 11 may acquire the video data including a plurality of image frames from the surveillance camera 110, or may acquire each of the plurality of image frames from the surveillance camera 110 in the capturing order. The video acquisition unit 11 may acquire not only video data generated by the surveillance camera 110 but also video data stored in an external storage, a server, or the like that is not illustrated.

The video storage unit 12 stores video data generated by the surveillance camera 110. The image frames constituting the video data stored in the video storage unit 12 are acquired by the tracking unit 13 and used for tracking the tracking target.

The tracking unit 13 stores the space threshold value and the time threshold value. The space threshold value is a spatial threshold value set in association with the tracking target detected from the verification target image frame (also referred to as verification frame). The time threshold value is a reference for extracting, from video data including a plurality of image frames, an image frame to be collated with a verification frame that is a verification target. The space threshold value and the time threshold value are values set by the user via the terminal device 120. The space threshold value and the time threshold value are updated by the threshold value update unit 16 with the space threshold value and the time threshold value set by the user at a discretionary timing. For example, the space threshold value and the time threshold value may be commonly set for all image frames constituting the video data, or may be set for each image frame.

The space threshold value is a value related to the collation range of the tracking target. For example, when the collation range is a circle, the space threshold value is set to the diameter or radius of the collation range. The space threshold value is adjusted according to the size of the tracking target in the verification frame. For example, the space threshold value is set to a value with reference to the size of the tracking target in the verification frame. For example, in a case where the tracking target is a person, the space threshold value is set to a ratio with reference to the height of the person. For example, a circle having a diameter or a radius of a value obtained by multiplying the height of the tracking target person by the space threshold value is set as the collation range. The space threshold value may be set by the number of pixels of the verification frame or the like instead of the ratio with reference to the height of the person.

The time threshold value is a temporal threshold value for setting how many frames before (how many seconds before) an image frame among image frames constituting video data is collated with the verification frame. The time threshold value corresponds to the maximum value of the time gone back when the tracking target is collated with reference to the time of the verification frame. Image frames from the image frame corresponding to the time of the time threshold value to the image frame immediately before the verification frame is a collation target of the verification frame. For example, the time threshold value is set by the number of frames indicating how many frames before (how many seconds before) an image frame among image frames constituting video data is collated with the verification frame. For example, in a case where the time threshold value is 10 frames, image frames for a total of 10 frames before 1, 2, . . . , and 10 frames before the image frame are collated with the verification frame. The time threshold value may be a value obtained by converting the number of frames into time.

The tracking unit 13 tracks the tracking target by collating the tracking target detected in the verification frame with the tracking target detected in the image frame of the collation target of the verification frame.

The tracking unit 13 acquires the verification frame from the video storage unit 12. The tracking unit 13 detects the tracking target from the acquired verification frame. For example, the tracking unit 13 detects the tracking target from the verification frame by a detection technique such as a background subtraction method. For example, the tracking unit 13 may detect the tracking target from the verification frame by a detection technique using a feature amount such as a motion vector. The tracking target of the tracking unit 13 is a person or a moving object (also referred to as mobile object). For example, in the case where the tracking target is a person, the tracking unit 13 detects the tracking target from the verification frame using a technique such as face detection. For example, the tracking unit 13 may detect the tracking target from the verification frame using human body detection, object detection, or the like. For example, the tracking unit 13 may detect an object that is not a mobile object but has a feature amount such as a shape, a pattern, or a color that changes at a certain position. For example, the tracking unit 13 collates the tracking target detected from consecutive verification frames using a technique such as face authentication or gait authentication.

Regarding the tracking target detected in the image frame extracted on the basis of the time threshold value, the tracking unit 13 collates a tracking target temporally and spatially close to the tracking target detected from the verification frame. If the degree of coincidence between those tracking targets is high, the tracking unit 13 determines that they are the same tracking targets and assigns the same identification number. In the present example embodiment, the collation method of the tracking target by the tracking unit 13 is not particularly limited. For example, in the case where the tracking target is a person, the tracking unit 13 collates the tracking target using a technique of face authentication or gait authentication. For example, the tracking unit 13 may collate the tracking target on the basis of features such as the entire body, the color, the posture of the clothes, and the belongings of the person detected from the verification frame. For example, the tracking unit 13 assigns a provisional identification number to the tracking target detected in the verification frame, and assigns a formal identification number to the tracking target detected in the verification frame after successfully collating with the tracking target detected in the image frame extracted on the basis of the time threshold value. The tracking unit 13 assigns a new identification number to a tracking target that is not detected in the image frame extracted on the basis of the time threshold value and is newly detected in the verification frame. For example, the tracking unit 13 predicts the position of the tracking target in the verification frame on the basis of tracking information in the image frame extracted on the basis of the time threshold value, and assigns the same identification number to the tracking target positioned in a vicinity of the predicted position on the screen. The tracking information is information in which the identification number of the tracking target, the position, the size, the speed, and the like of the tracking target in the image frame are associated with the tracking target detected from the image frame.

Regarding the tracking target detected from the verification frame, the tracking unit 13 generates tracking information in which the identification number of the tracking target, the position, the size, the speed, and the like of the tracking target in the image frame are associated. The tracking unit 13 sets the collation range based on the space threshold value in association with the position of the tracking target according to the size of the tracking target in the image frame. The tracking unit 13 adds the set collation range to the tracking information. The tracking unit 13 outputs the tracking information for each image frame constituting the video data to the display information generation unit 14.

The display information generation unit 14 acquires, from the tracking unit 13, the tracking information for each of the plurality of image frames constituting the video data. Using the acquired tracking information, the display information generation unit 14 generates display information including a tracking image in which the collation range is associated with the tracking target in an image frame, and an operation image for setting the time threshold value and the space threshold value. The display information generated by the display information generation unit 14 is a graphical user interface (GUI) to be displayed on the terminal device 120 referred to by the user. The display information generation unit 14 outputs the generated display information to the display information output unit 15.

The display information output unit 15 acquires a GUI for each image frame constituting the video data from the display information generation unit 14. The display information output unit 15 outputs the display information for each image frame to the terminal device 120. The display information for each image frame is displayed as a GUI on the screen referred to by the user.

The threshold value update unit 16 acquires, from the terminal device 120, the space threshold value and the time threshold value set by the user. The threshold value update unit 16 updates, with the acquired space threshold value and time threshold value, the space threshold value and the time threshold value stored in the tracking unit 13. For example, the threshold value update unit 16 may commonly update the space threshold value and the time threshold value for all the image frames constituting the video data, or may update the space threshold value and the time threshold value for the individual image frames.

Figure 2:
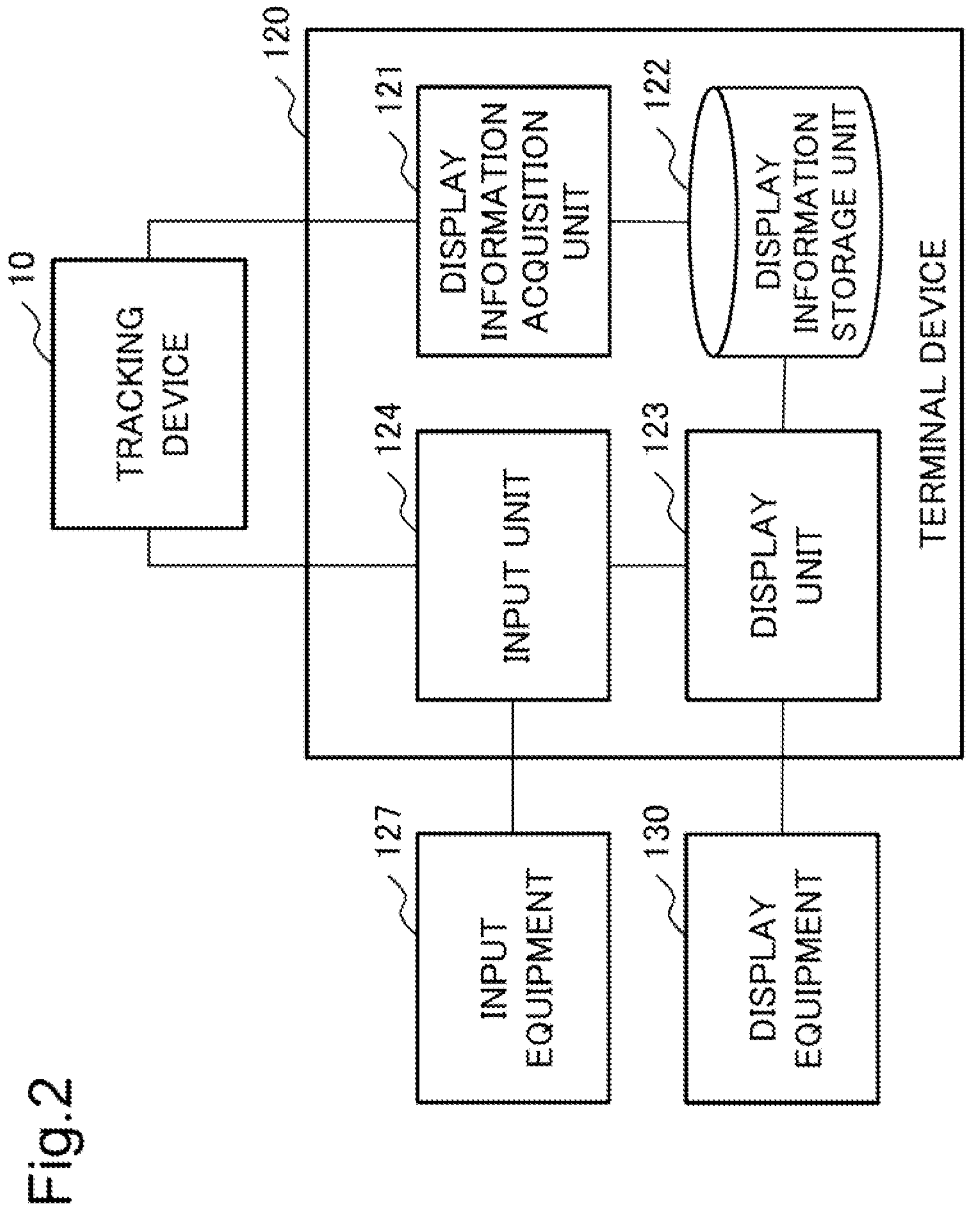
FIG. 2 is a block diagram illustrating an example of a configuration of a terminal device included in the tracking system according to the first example embodiment.

FIG. 2 is a block diagram illustrating an example of the configuration of a terminal device 120 and the like. The terminal device 120 includes a display information acquisition unit 121, a display information storage unit 122, a display unit 123, and an input unit 124. FIG. 2 additionally illustrates the tracking device 10, input equipment 127, and display equipment 130 that are connected to the terminal device 120.

The display information acquisition unit 121 acquires the tracking information for each of the plurality of image frames constituting the video data from the tracking device 10. The display information acquisition unit 121 stores the tracking information for each image frame into the display information storage unit 122.

The display information storage unit 122 stores the display information generated by the display information generation unit 14. The display information stored in the display information storage unit 122 is displayed as a GUI on the screen of the display unit 123 according to, for example, a user's operation or the like.

The display unit 123 is connected to the display equipment 130 that has a screen. The display unit 123 acquires the display information from the display information storage unit 122. The display unit 123 displays the acquired display information onto the screen of the display equipment 130. The terminal device 120 may include the function of the display equipment 130.

For example, the display unit 123 accepts an operation by the user via the input unit 124, and displays the display information corresponding to the accepted operation content onto the screen of the display equipment 130. For example, the display unit 123 displays, onto the screen of the display equipment 130, the display information corresponding to the image frame of the frame number designated by the user. For example, the display unit 123 displays, onto the screen of the display equipment 130 in chronological order, display information corresponding to each of a plurality of series of image frames including an image frame having the frame number designated by the user.

For example, the display unit 123 may display at least one piece of display information onto the screen of the display equipment 130 according to a display condition set in advance. For example, the display condition set in advance is a condition that a plurality of pieces of display information corresponding to a predetermined number of consecutive image frames including the frame number set in advance is displayed in chronological order. For example, the display condition set in advance is a condition that a plurality of pieces of display information corresponding to a plurality of image frames generated in a predetermined time slot including a time set in advance is displayed in chronological order. The display condition is not limited to the example described here as long as it is set in advance.

The input unit 124 is connected to the input equipment 127 that accepts the operation by the user. For example, the input equipment 127 is achieved by a keyboard, a touchscreen, a mouse, or the like. The input unit 124 outputs, to the tracking device 10, the operation content by the user input via the input equipment 127. Upon accepting designation of video data, an image frame, display information, and the like from the user, the input unit 124 outputs, to the display unit 123, an instruction to display the designated image onto the screen.

Figure 3:
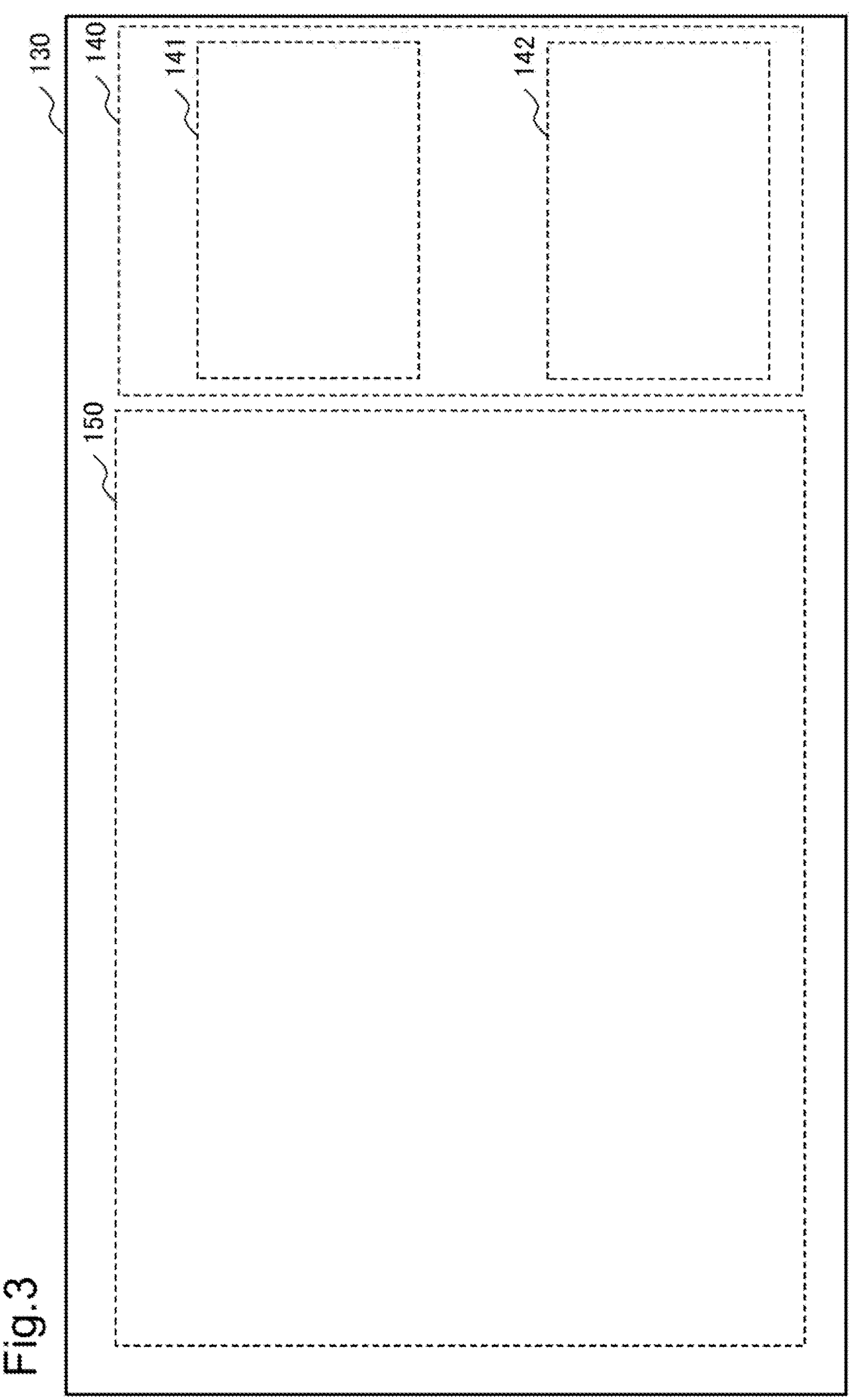
FIG. 3 is a conceptual diagram illustrating an example of a display area set on a screen of display equipment connected to a terminal device included in the tracking system according to the first example embodiment.

FIG. 3 is a conceptual diagram for describing display information displayed on the screen of the display equipment 130. A threshold value setting area 140 and an image display area 150 are set on the screen of the display equipment 130. The threshold value setting area 140 includes a space threshold value setting area 141 for setting a space threshold value and a time threshold value setting area 142 for setting a time threshold value. An operation image is displayed in the threshold value setting area 140. In the image display area 150, a tracking image for each image frame is displayed. A display area other than the threshold value setting area 140 and the image display area 150 may be set onto the screen of the display equipment 130. The display positions of the threshold value setting area 140 and the image display area 150 on the screen can be discretionarily changed.

Figure 4:
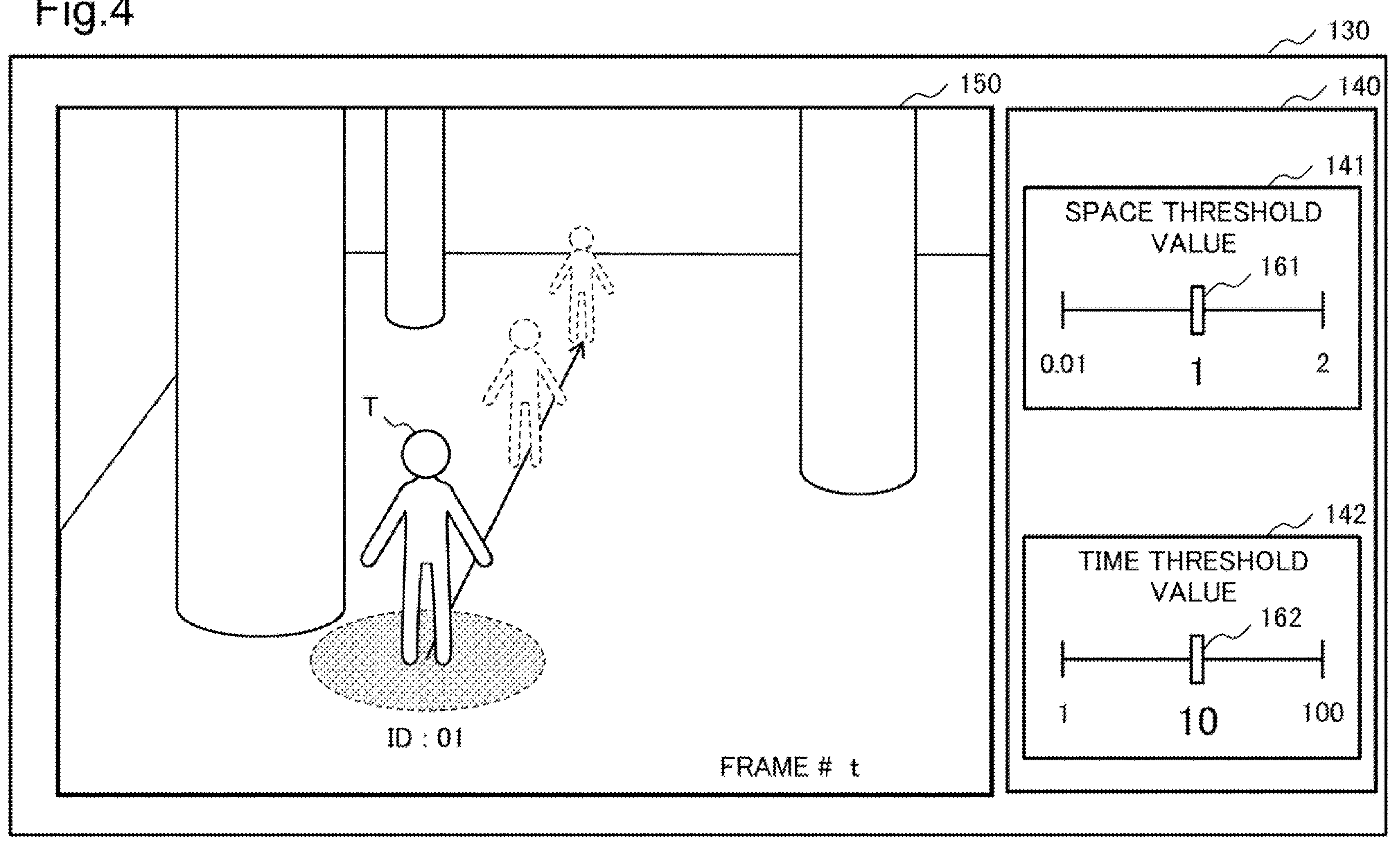
FIG. 4 is a conceptual diagram illustrating an example of display information displayed on a screen of display equipment connected to a terminal device included in the tracking system according to the first example embodiment.
Figure 5:
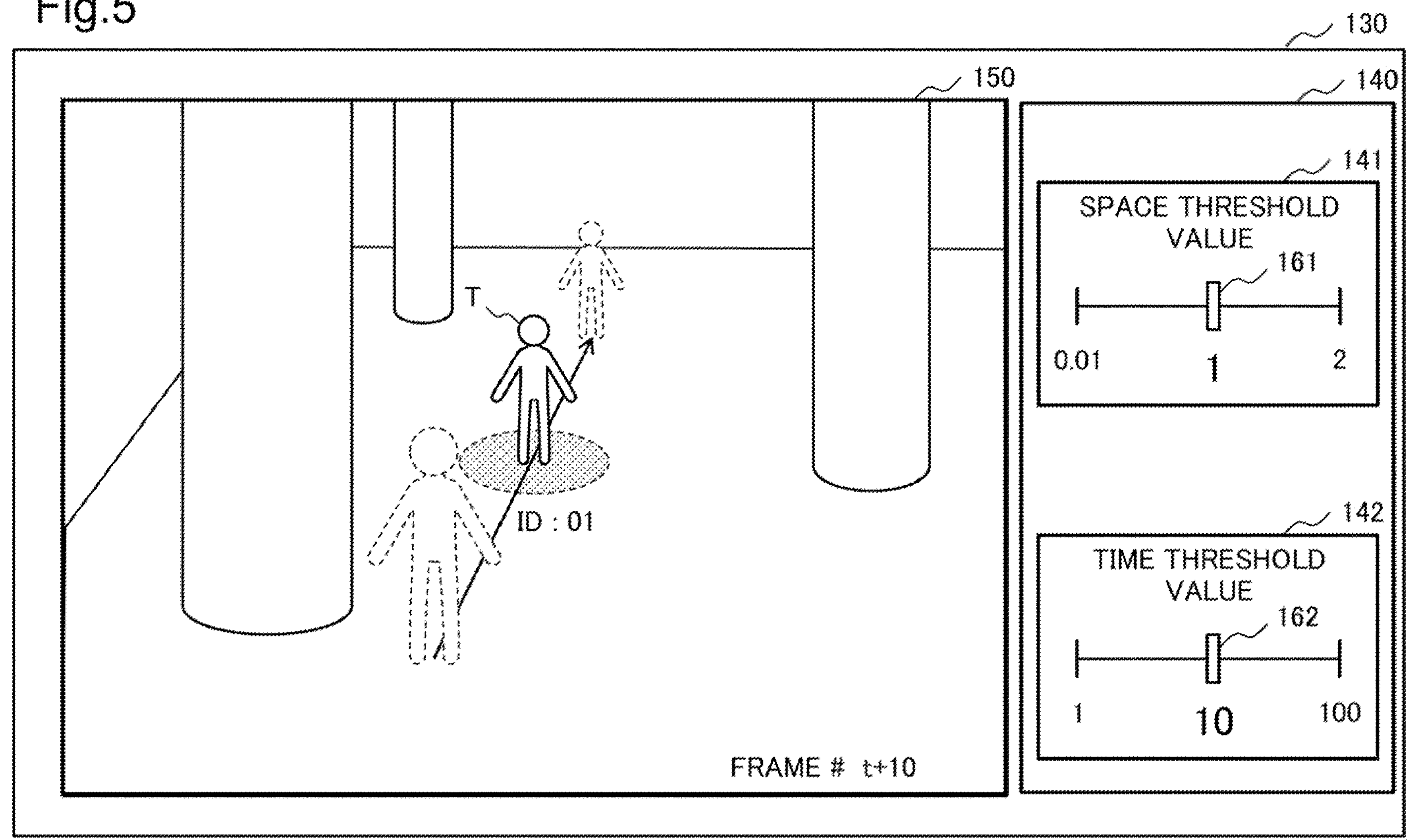
FIG. 5 is a conceptual diagram illustrating an example of display information displayed on the screen of the display equipment connected to the terminal device included in the tracking system according to the first example embodiment.
Figure 6:
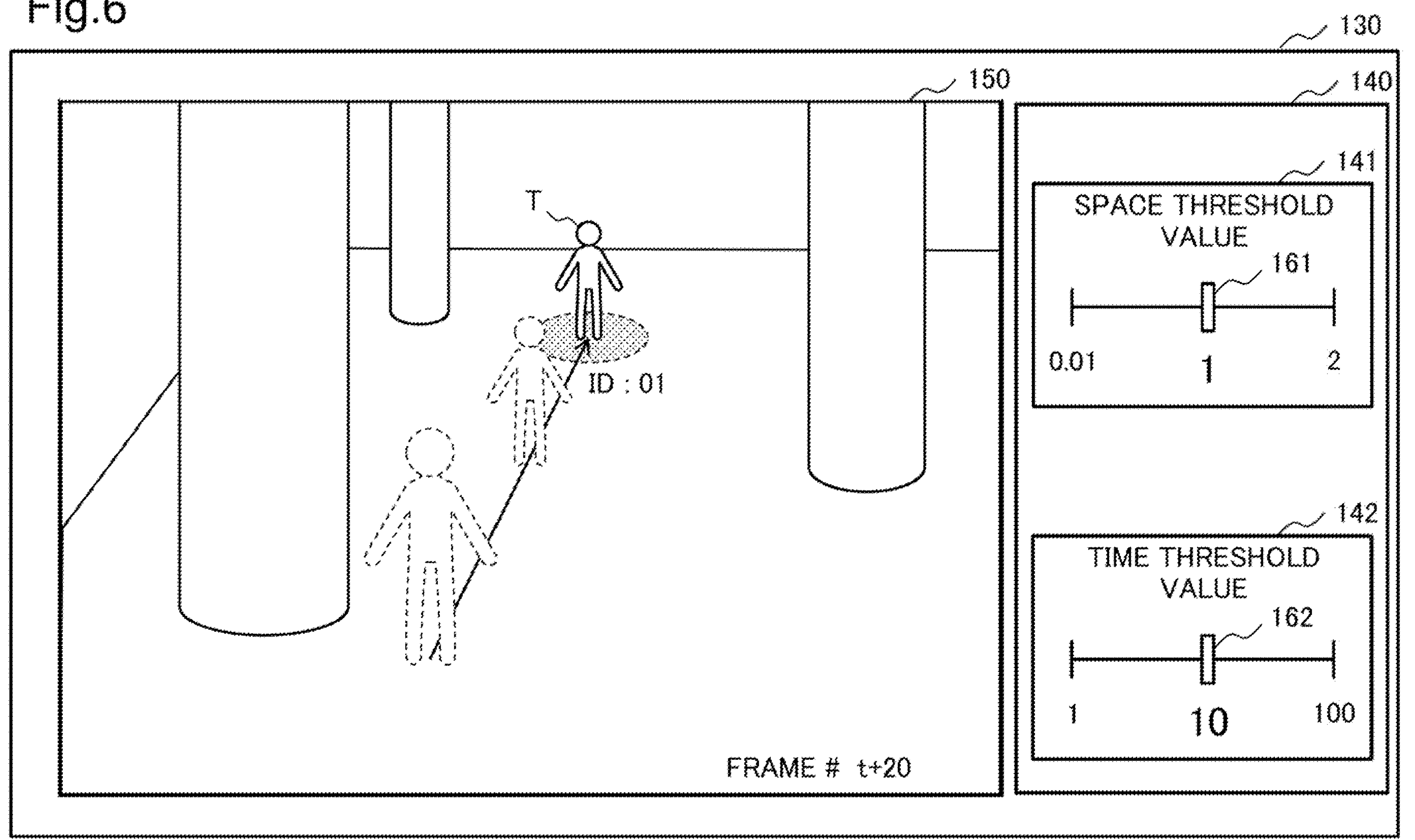
FIG. 6 is a conceptual diagram illustrating an example of display information displayed on the screen of the display equipment connected to the terminal device included in the tracking system according to the first example embodiment.

FIGS. 4 to 6 are conceptual diagrams illustrating an example of display information displayed in a display area set on the screen of the display equipment 130. FIGS. 4 to 6 are examples in which a verification frame for the frame numbers t, t+10, and t+20, respectively, are displayed in the image display area 150. Actually, the display information corresponding to image frames between the verification frames is continuously displayed in the display area chronologically, but in the following, an example in which an image frame corresponding to the verification frame is displayed in the display area will be described.

In the space threshold value setting area 141, a scroll bar for setting the space threshold value is displayed. A minimum value (left end) and a maximum value (right end) of the space threshold value are set to the scroll bar displayed in the space threshold value setting area 141. In the space threshold value setting area 141, not a horizontal scroll bar but a vertical scroll bar may be displayed. In the space threshold value setting area 141, not the scroll bar but a spin button, a combo box, or the like for setting the space threshold value may be displayed. In the space threshold value setting area 141, an element that is not an element such as the scroll bar for setting the space threshold value may be displayed.

In the example of FIGS. 4 to 6, the height of a tracking target T in the image frame is set as a reference (1), and the ratio with respect to the reference is set as the space threshold value. In the examples of FIG. 4 to 6, the space threshold value has a minimum value of 0.01 and a maximum value of 2. The minimum value and the maximum value of the space threshold value may be fixed values or may be changed according to a user's input. When a knob 161 is moved left and right within the range between the minimum value (left end) and the maximum value (right end), the space threshold value is changed. In the examples of FIGS. 4 to 6, the knob 161 on the scroll bar is at the position of 1, and a space threshold value (1) being set is displayed below the knob 161. For example, when the knob 161 in the selected state is moved left and right, or when the left-right position of the knob 161 on the scroll bar is selected, the knob 161 moves. The user can set the space threshold value by operating the position of the knob 161.

In the time threshold value setting area 142, a scroll bar for setting the time threshold value is displayed. A minimum value (left end) and a maximum value (right end) of the time threshold value are set to the scroll bar displayed in the time threshold value setting area 142. In the time threshold value setting area 142, not a horizontal scroll bar but a vertical scroll bar may be displayed. In the time threshold value setting area 142, not the scroll bar but a spin button, a combo box, or the like for setting the time threshold value may be displayed. In the time threshold value setting area 142, an element that is not an element such as the scroll bar for setting the time threshold value may be displayed.

In the examples of FIGS. 4 to 6, the time threshold value has a minimum value of 1 and a maximum value of 100. The minimum value and the maximum value of the time threshold value may be fixed values or may be changed according to a user's input. When a knob 162 is moved left and right within the range between the minimum value (left end) and the maximum value (right end), the time threshold value is changed. In the examples of FIGS. 4 to 6, the knob 162 on the scroll bar is at the position of 10, and a time threshold value (10) being set is displayed below the knob 162. For example, when the knob 162 in the selected state is moved left and right, or when the left-right position of the knob 162 on the scroll bar is selected, the knob 162 moves. The user can set the time threshold value by operating the position of the knob 162.

In the image display area 150, a tracking image in which a collation range or the like is superimposed on an image frame constituting video data generated by the surveillance camera 110 is displayed. FIGS. 4 to 6 are examples in which the tracking target T assigned with an identification number 1 moves in a space having several columns in the orientation of the arrow. The identification number may be displayed or needs not be displayed in association with the position of the tracking target. The human figure indicated by the broken line is for describing the trajectory along with movement of the tracking target T, and is not displayed in the tracking image. Around the tracking target T in the image frame, a circle centered on the tracking target T and having the space threshold value as a diameter is set as a collation range. In the image display area 150, the circle indicating the collation range set around the tracking target T is displayed in a shape corresponding to the viewpoint, the angle of view, and the like of the surveillance camera 110. The collation range can be modified into not a circle but a discretionary shape such as an ellipse, a rectangle, a square, an equilateral triangle, or a regular pentagon. As in FIGS. 4 to 6, the size of the collation range is changed in accordance with the size of the tracking target T in the image frame.

Figure 7:
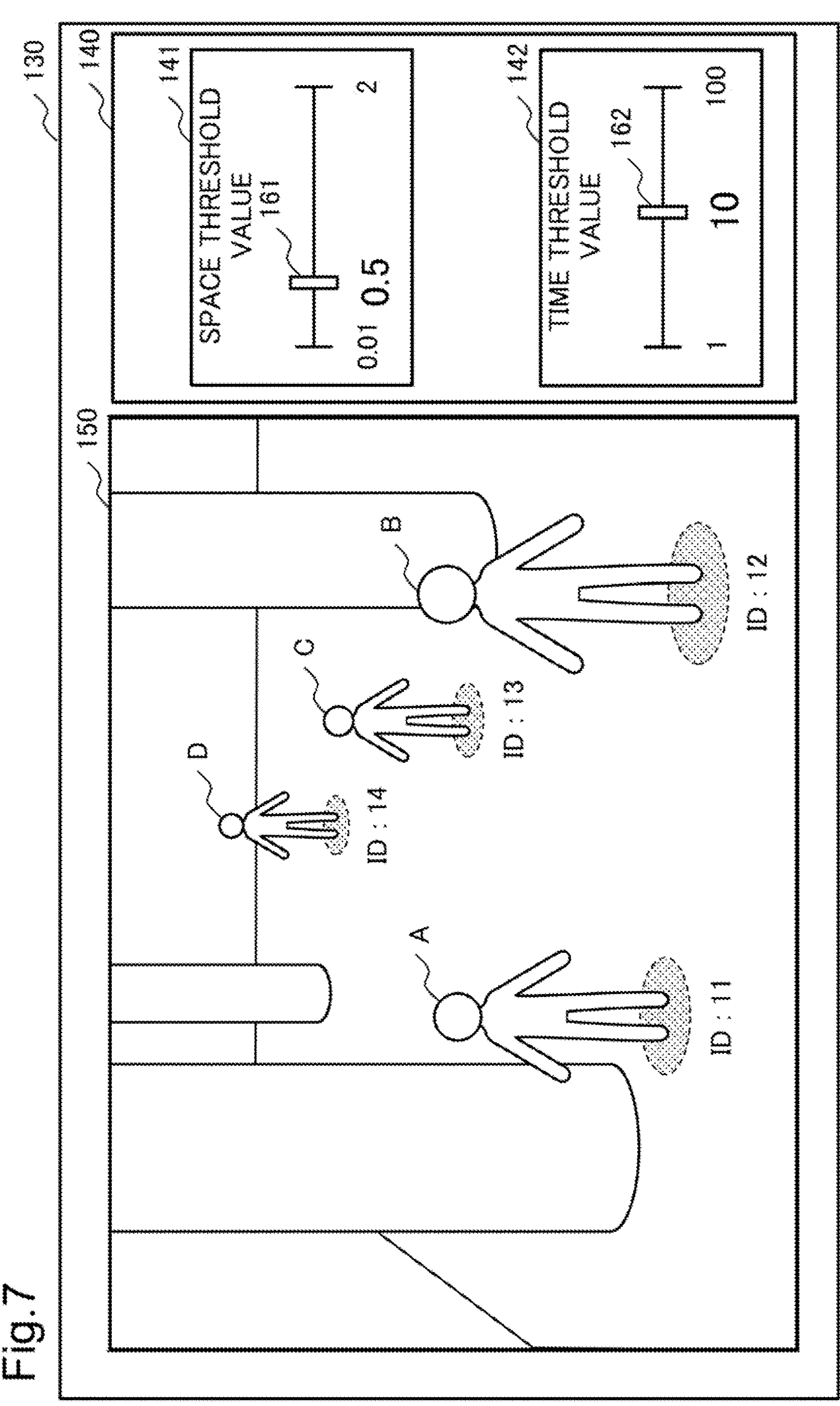
FIG. 7 is a conceptual diagram illustrating an example of display information displayed on the screen of the display equipment connected to the terminal device included in the tracking system according to the first example embodiment.
Figure 8:
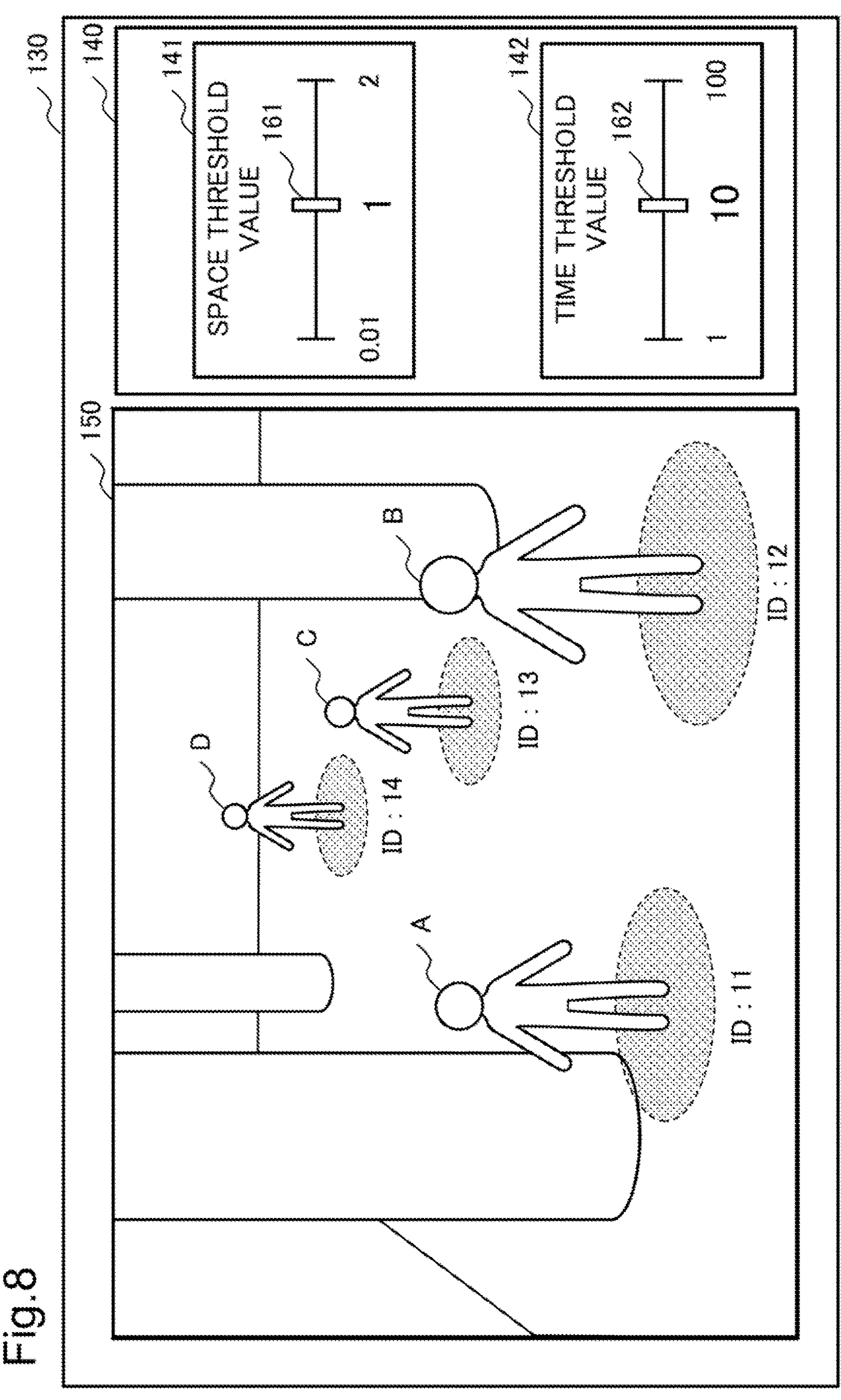
FIG. 8 is a conceptual diagram illustrating an example of display information displayed on the screen of the display equipment connected to the terminal device included in the tracking system according to the first example embodiment.

FIG. 7 is an example in which a tracking image of an image frame in which a plurality of tracking targets (tracking targets A, B, C, and D) are detected is displayed in the image display area 150. In the example of FIG. 7, the space threshold value is set to 0.5 and the time threshold value is set to 10. An identification number 11 is assigned to the tracking target A, an identification number 12 is assigned to the tracking target B, an identification number 13 is assigned to the tracking target C, and an identification number 14 is assigned to the tracking target D. FIG. 8 illustrates an example in which the space threshold value is changed from 0.5 to 1 regarding the example of FIG. 7. When the space threshold value is changed from 0.5 to 1, the size of the collation range set around the tracking target is changed.

Figure 9:
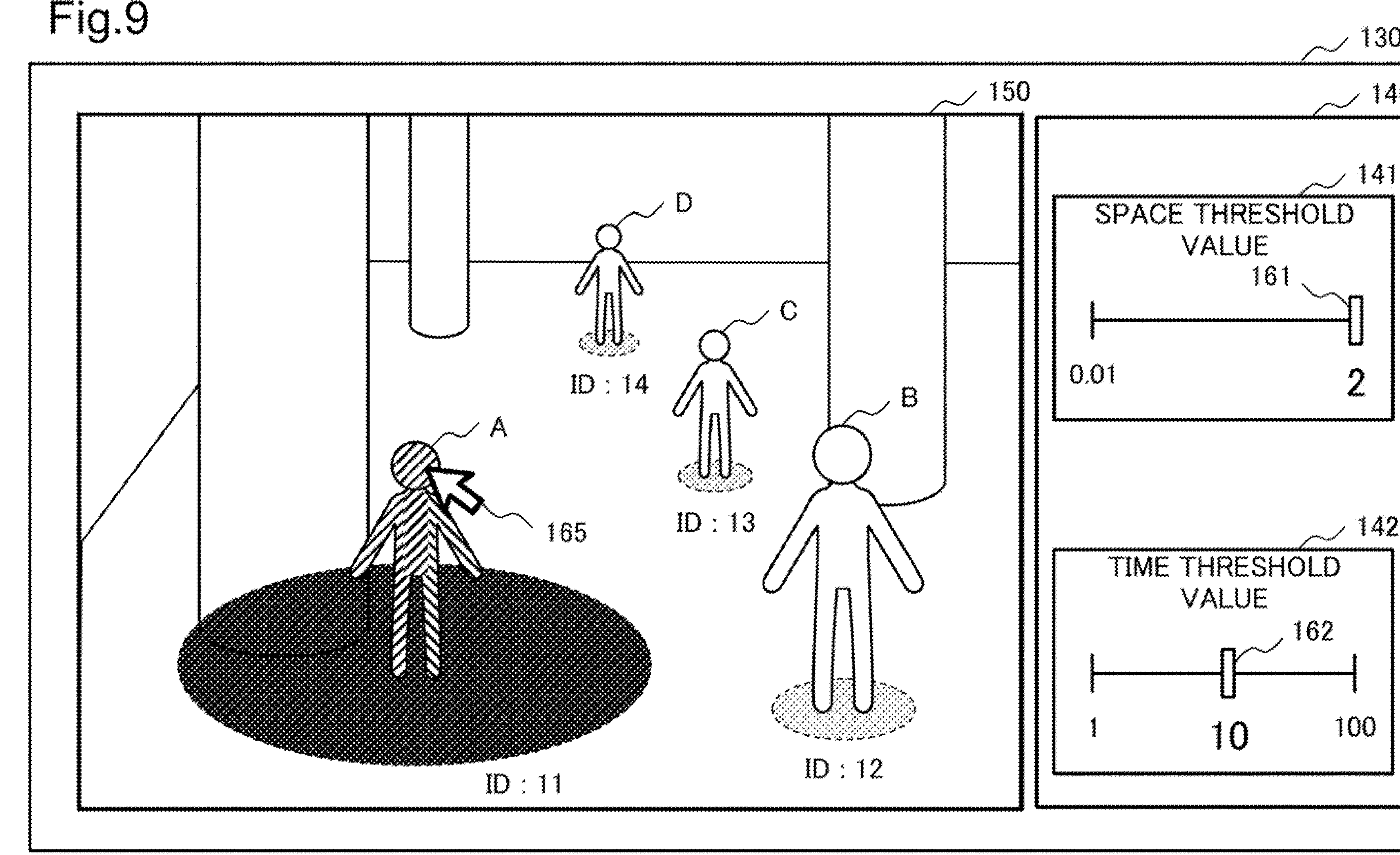
FIG. 9 is a conceptual diagram illustrating an example of display information displayed on the screen of the display equipment connected to the terminal device included in the tracking system according to the first example embodiment.

FIG. 9 is a modified example in which the tracking target A is selected by superimposing a pointer 165 onto the position of the tracking target A and the space threshold value of the tracking target A is changed from 0.5 to 2 with respect to the example of FIG. 7. In the case of the example of FIG. 9, the collation ranges of the tracking targets (B, C, and D) other than the tracking target A remain unchanged at 0.5. The space threshold value of the selected tracking target may remain unchanged, and the space threshold value of the unselected tracking target may be changed to a value set in the space threshold value setting area.

Figure 10:
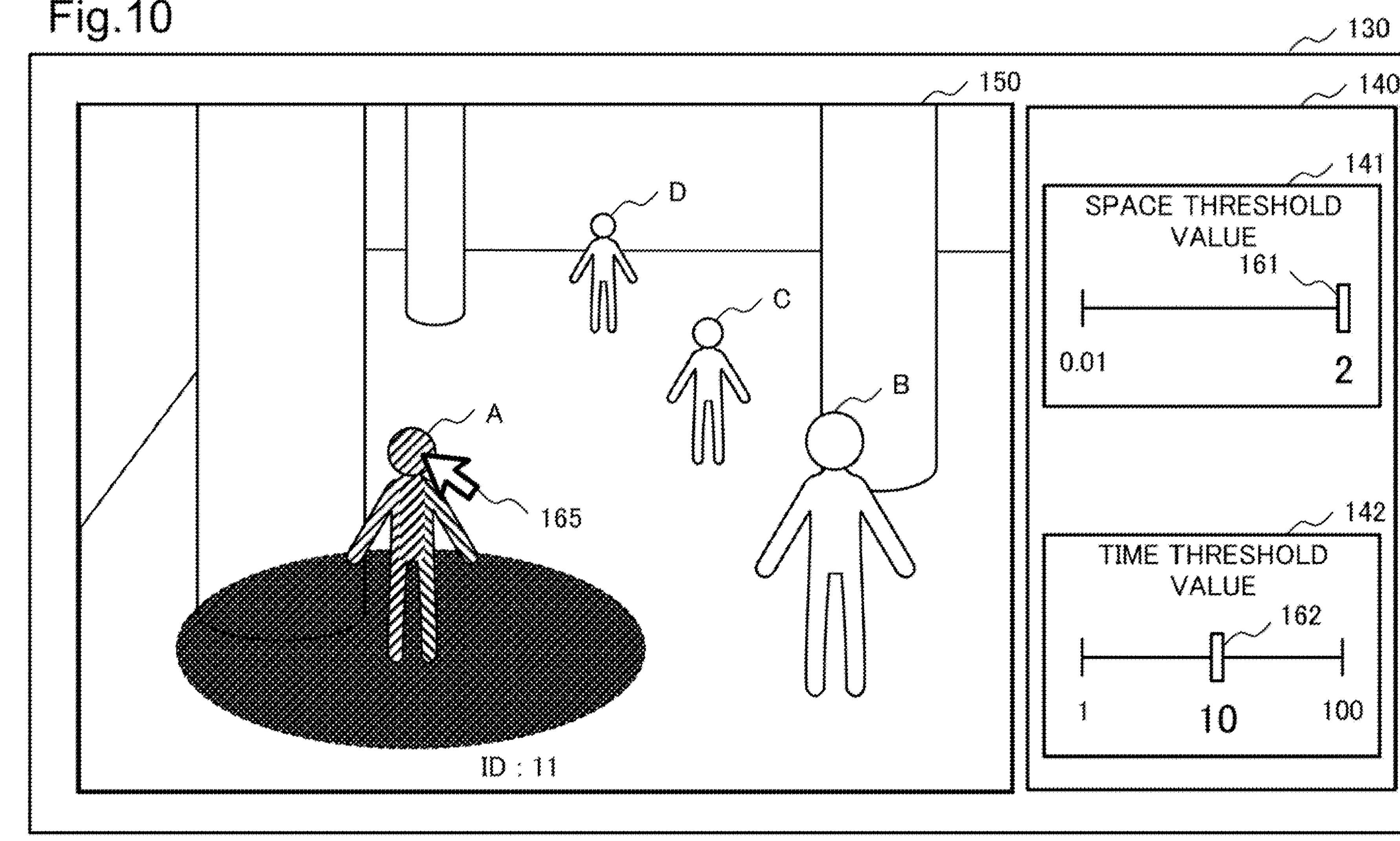
FIG. 10 is a conceptual diagram illustrating an example of display information displayed on the screen of the display equipment connected to the terminal device included in the tracking system according to the first example embodiment.

FIG. 10 illustrates, regarding the example of FIG. 7, a modified example in which the tracking target A is selected by superimposing the pointer 165 on the position of the tracking target A, the collation ranges of the tracking targets (B, C, and D) other than the tracking target A are not displayed, and the space threshold value of the tracking target A is changed from 0.5 to 2. The configuration as illustrated in FIG. 10 makes it possible to perform tracking focusing on a specific tracking target. As illustrated in FIGS. 9 and 10, in a case where the tracking target is selected in the image display area 150, a change in the collation range or the like may be processed on the terminal device 120 side or may be processed on the tracking device 10 side.

Figure 11:
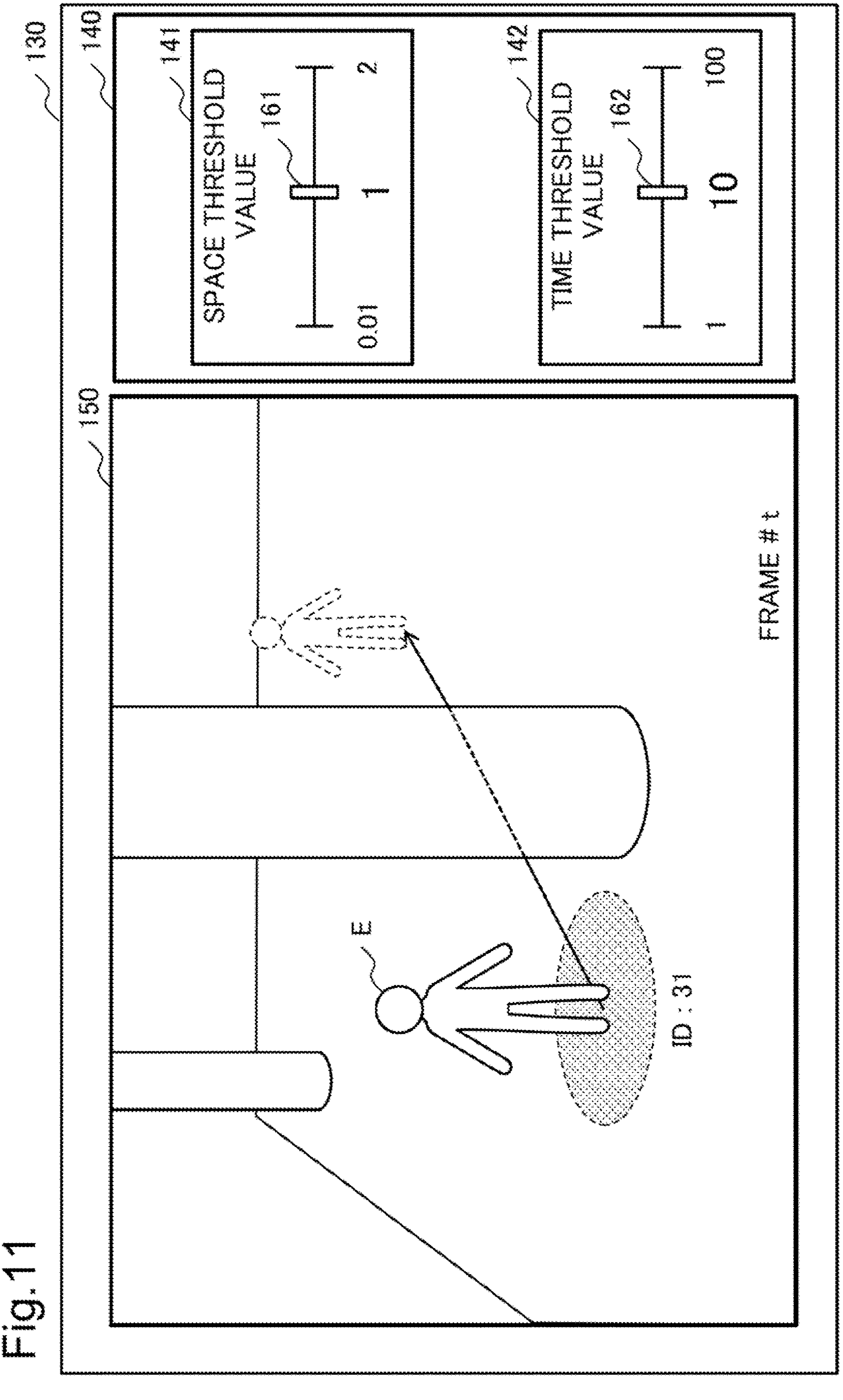
FIG. 11 is a conceptual diagram illustrating an example of display information displayed on the screen of the display equipment connected to the terminal device included in the tracking system according to the first example embodiment.
Figure 12:
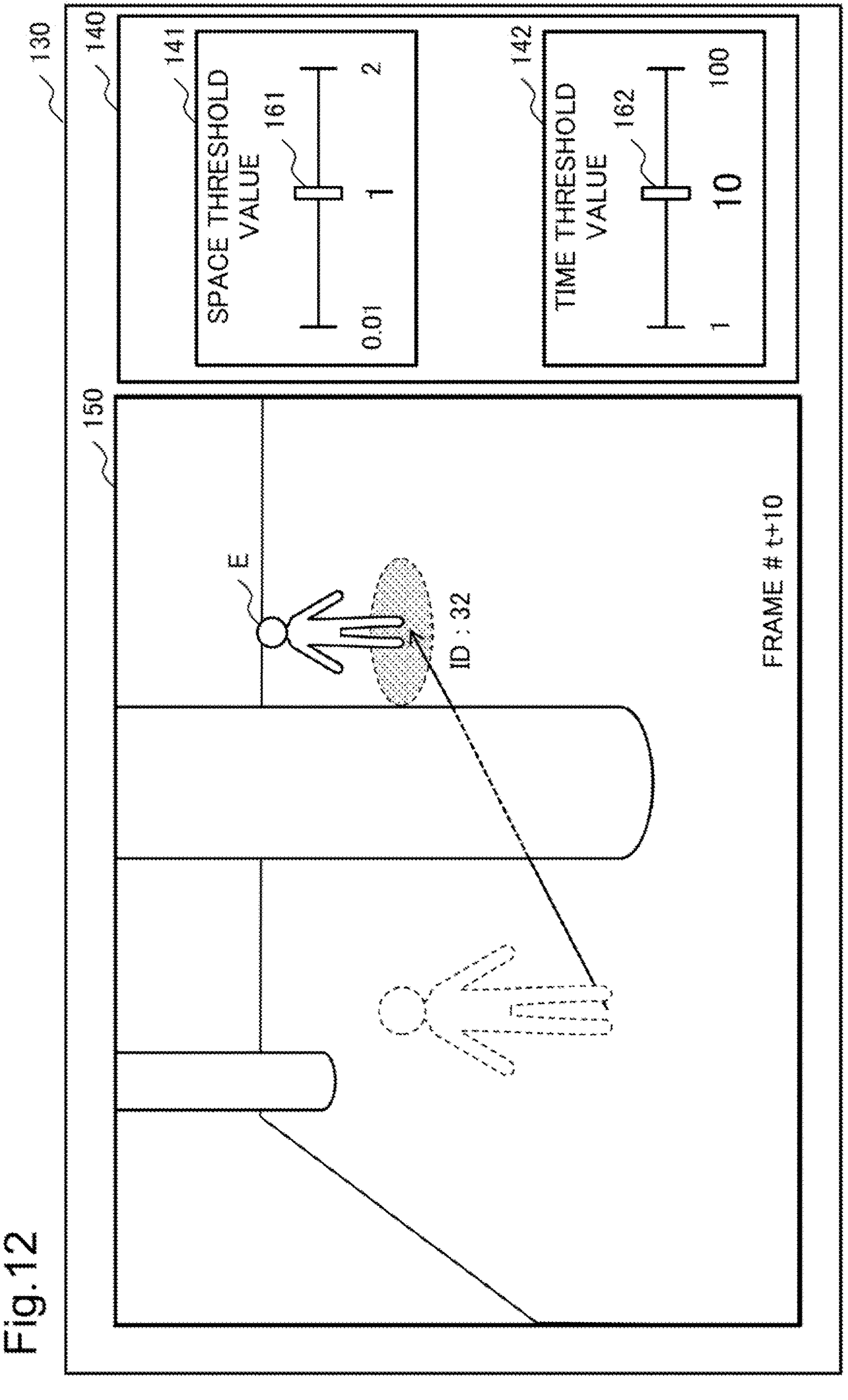
FIG. 12 is a conceptual diagram illustrating an example of display information displayed on the screen of the display equipment connected to the terminal device included in the tracking system according to the first example embodiment.

FIGS. 11 and 12 are conceptual diagrams for describing examples in which a tracking target E moves through the other side of the column. In the image display area 150 of FIG. 11, the tracking image of the image frame with the frame number t is displayed. In the tracking image of the image frame with the frame number t, an identification number 31 is assigned to the tracking target E. In the image display area 150 of FIG. 12, the tracking image of the image frame with the frame number t+10 subsequent to the image frame with the frame number t is displayed. In the image frame with the frame number t+10, an identification number 32 different from the image frame with the frame number t is assigned to the tracking target E. Thus, one reason why different identification numbers are assigned to the same tracking target in different image frames is that the space threshold value, which is a spatial threshold value, is too small. If the space threshold value is too small, the collation ranges do not overlap between consecutive image frames, and different identification numbers are likely to be assigned to the same tracking target.

Figure 13:
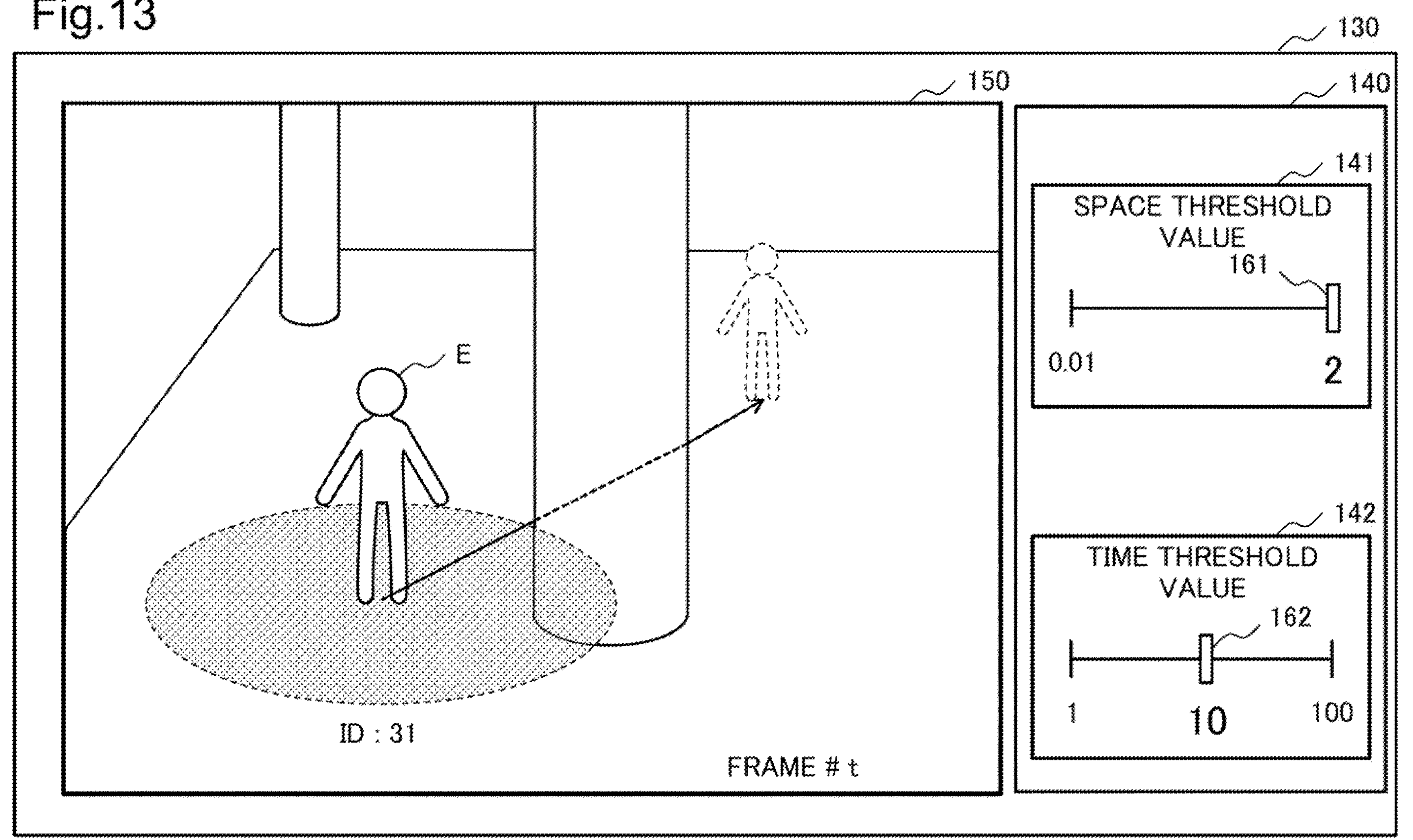
FIG. 13 is a conceptual diagram illustrating an example of display information displayed on the screen of the display equipment connected to the terminal device included in the tracking system according to the first example embodiment.
Figure 14:
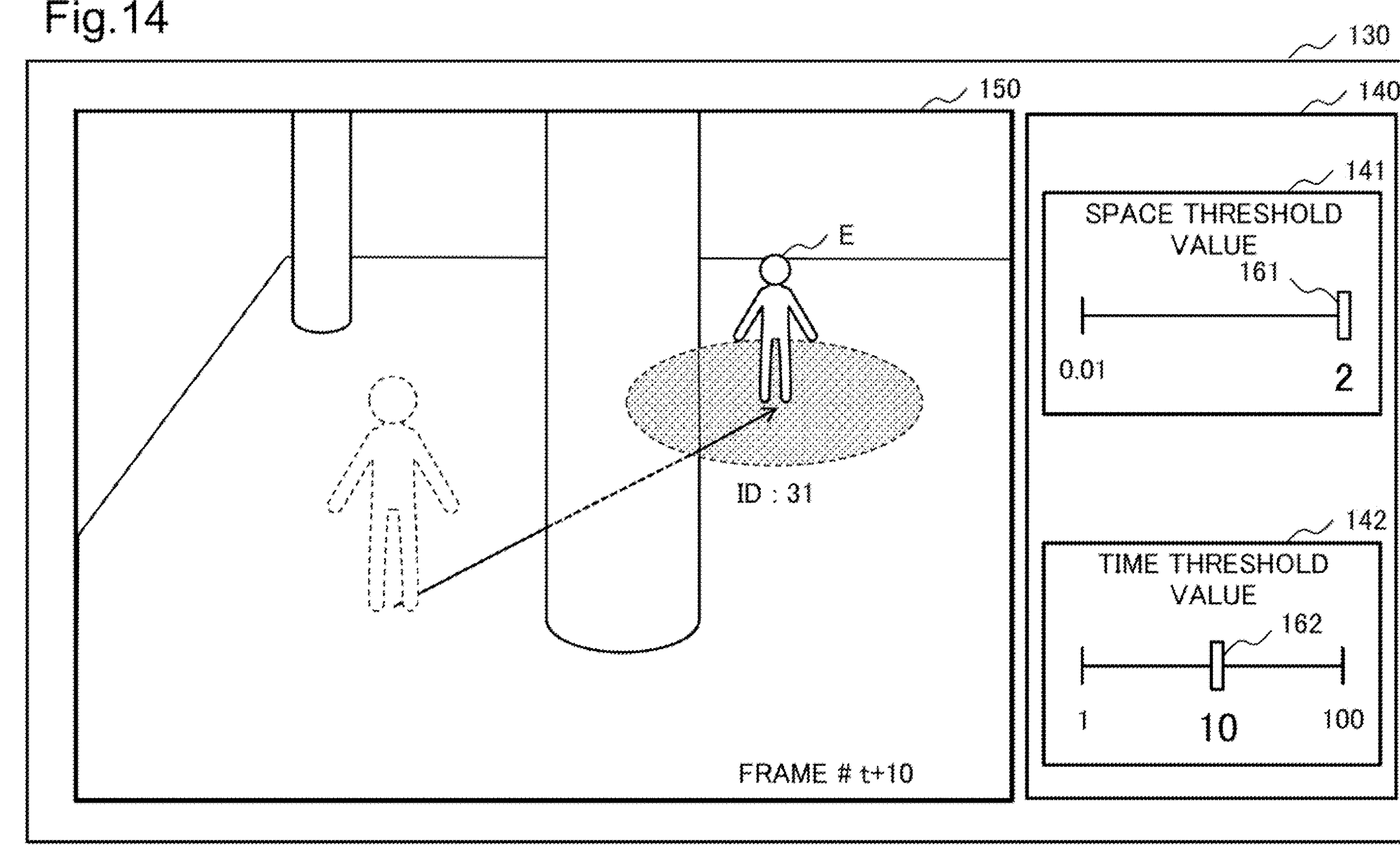
FIG. 14 is a conceptual diagram illustrating an example of display information displayed on the screen of the display equipment connected to the terminal device included in the tracking system according to the first example embodiment.

FIGS. 13 and 14 are conceptual diagrams for describing examples of adjusting the space threshold value according to the setting of the user in the examples of FIGS. 11 and 12. In the examples of FIGS. 11 and 12, the space threshold value is set to 1. On the other hand, in the examples of FIGS. 13 and 14, the space threshold value is set to 2.

In the image display area 150 of FIG. 13, the tracking image of the image frame with the frame number t is displayed. In the tracking image of the image frame with the frame number t, an identification number 31 is assigned to the tracking target E. In the image display area 150 of FIG. 14, the tracking image of the image frame with the frame number t+10 subsequent to the image frame with the frame number t is displayed. In the image frame with the frame number t+10, the identification number 31 same as that of the image frame with the frame number t is assigned to the tracking target E.

Thus, in a case where different identification numbers are assigned to the same tracking target in a series of image frames, the space threshold value, which is a spatial threshold value, is only required to be increased. When the space threshold value is increased, the collation ranges easily overlap between consecutive image frames, and the flow lines of the tracking target are easily connected, and therefore different identification numbers are less likely to be assigned to the same tracking target in a series of image frames. When the space threshold value is excessively increased, the collation ranges of different tracking targets overlap each other between consecutive image frames, and the identification numbers are easily switched. Therefore, in order to reduce assignment of different identification numbers to the same tracking target in a series of image frames, it is effective that the space threshold value can be adjusted to an optimum value according to the setting of the user as in the present example embodiment.

Figure 15:
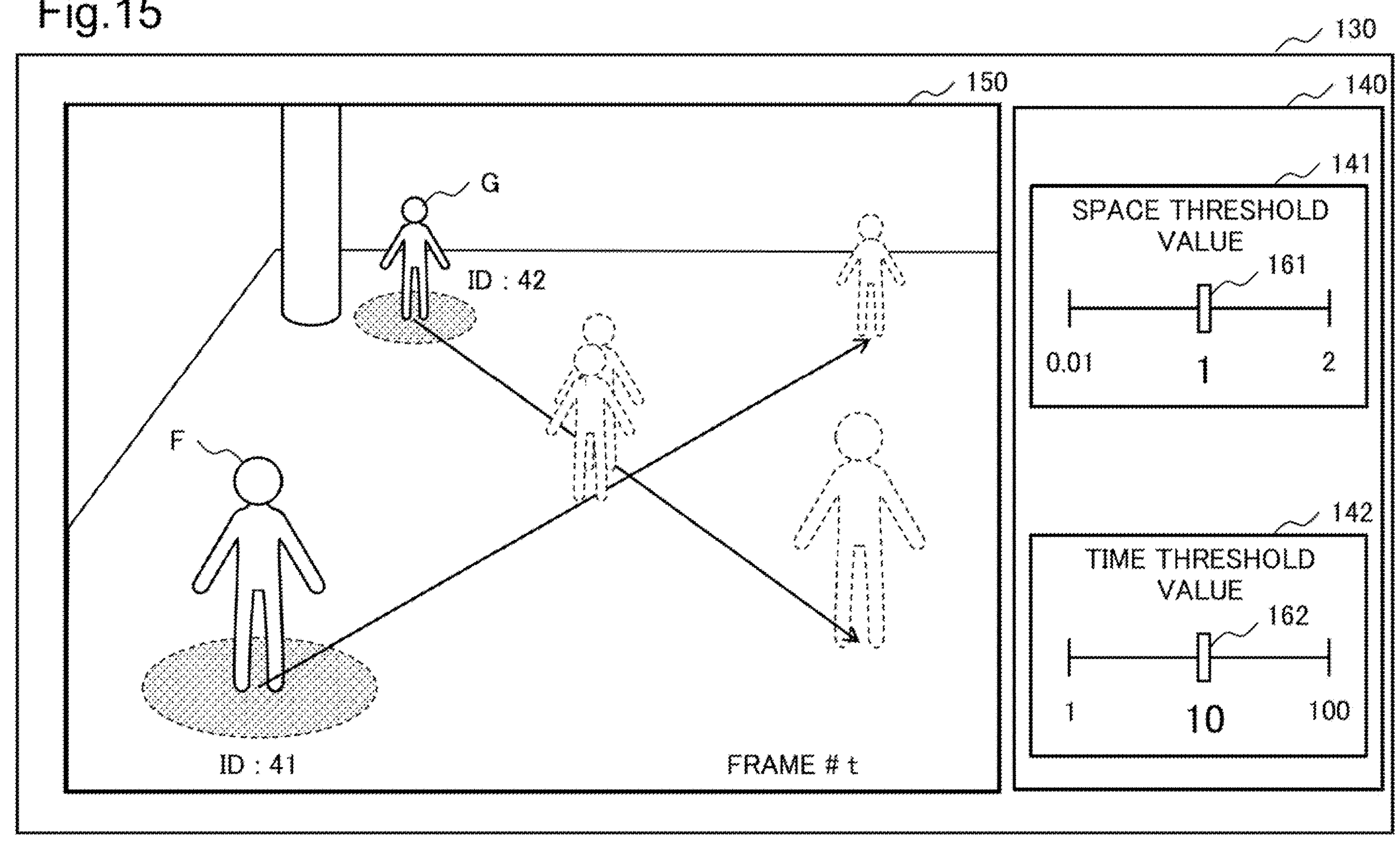
FIG. 15 is a conceptual diagram illustrating an example of display information displayed on the screen of the display equipment connected to the terminal device included in the tracking system according to the first example embodiment.
Figure 16:
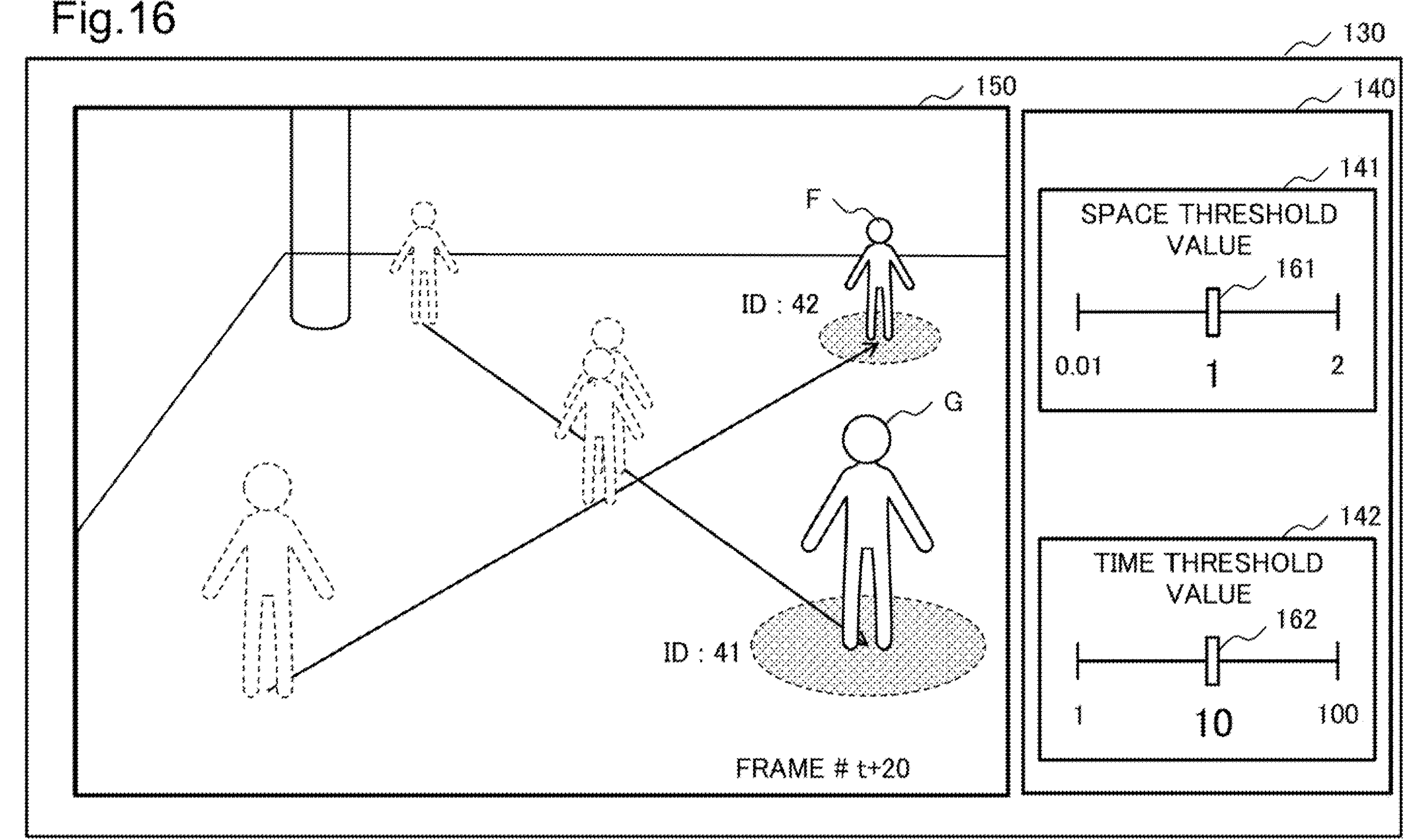
FIG. 16 is a conceptual diagram illustrating an example of display information displayed on the screen of the display equipment connected to the terminal device included in the tracking system according to the first example embodiment.

FIGS. 15 and 16 are conceptual diagrams for describing examples in which a tracking target F and a tracking target G pass by each other. In the image display area 150 of FIG. 15, the tracking image of the image frame with the frame number t is displayed. In the tracking image of the image frame with the frame number t, an identification number 41 is assigned to the tracking target F, and an identification number 42 is assigned to the tracking target G. In the image display area 150 of FIG. 16, the tracking image of the image frame with the frame number t+20 subsequent to the image frame with the frame number t+10 is displayed. In the tracking image of the image frame with the frame number t+20, the identification number 42 is assigned to the tracking target F, and the identification number 41 is assigned to the tracking target G. In the examples of FIGS. 15 and 16, it is estimated that an error has occurred in the estimation of the flow line between the image frame with the frame number t+10 and the image frame with the frame number t+20. Thus, one reason why the identification numbers are switched when different tracking targets pass by each other in a series of image frames, the time threshold value, which is a temporal threshold value, is too small. If the time threshold value is too small, the number of image frames used for collation of the tracking target is insufficient, and the tracking accuracy is degraded, and therefore the identification numbers are easily switched when the tracking targets pass by each other.

Figure 17:
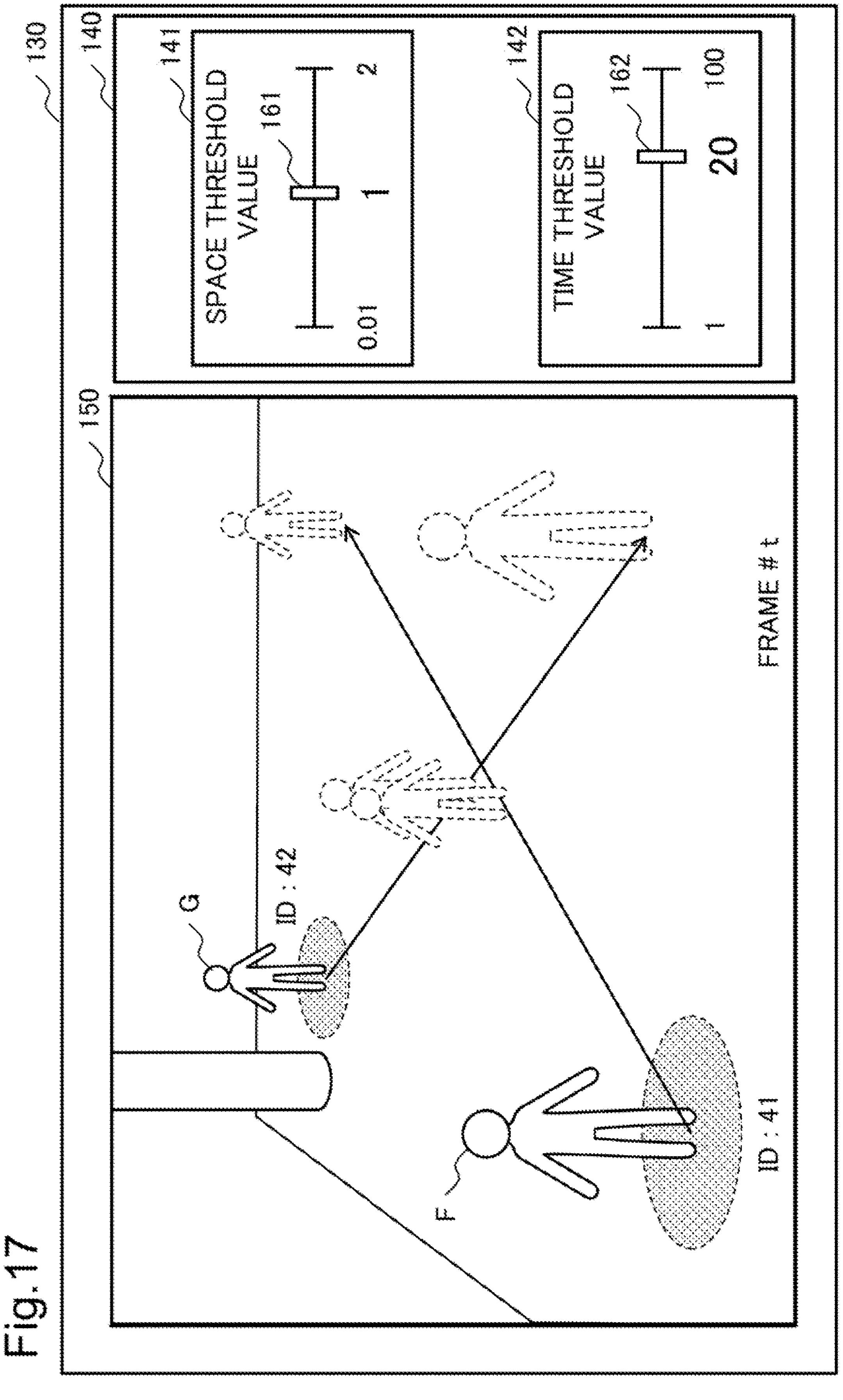
FIG. 17 is a conceptual diagram illustrating an example of display information displayed on the screen of the display equipment connected to the terminal device included in the tracking system according to the first example embodiment.
Figure 18:
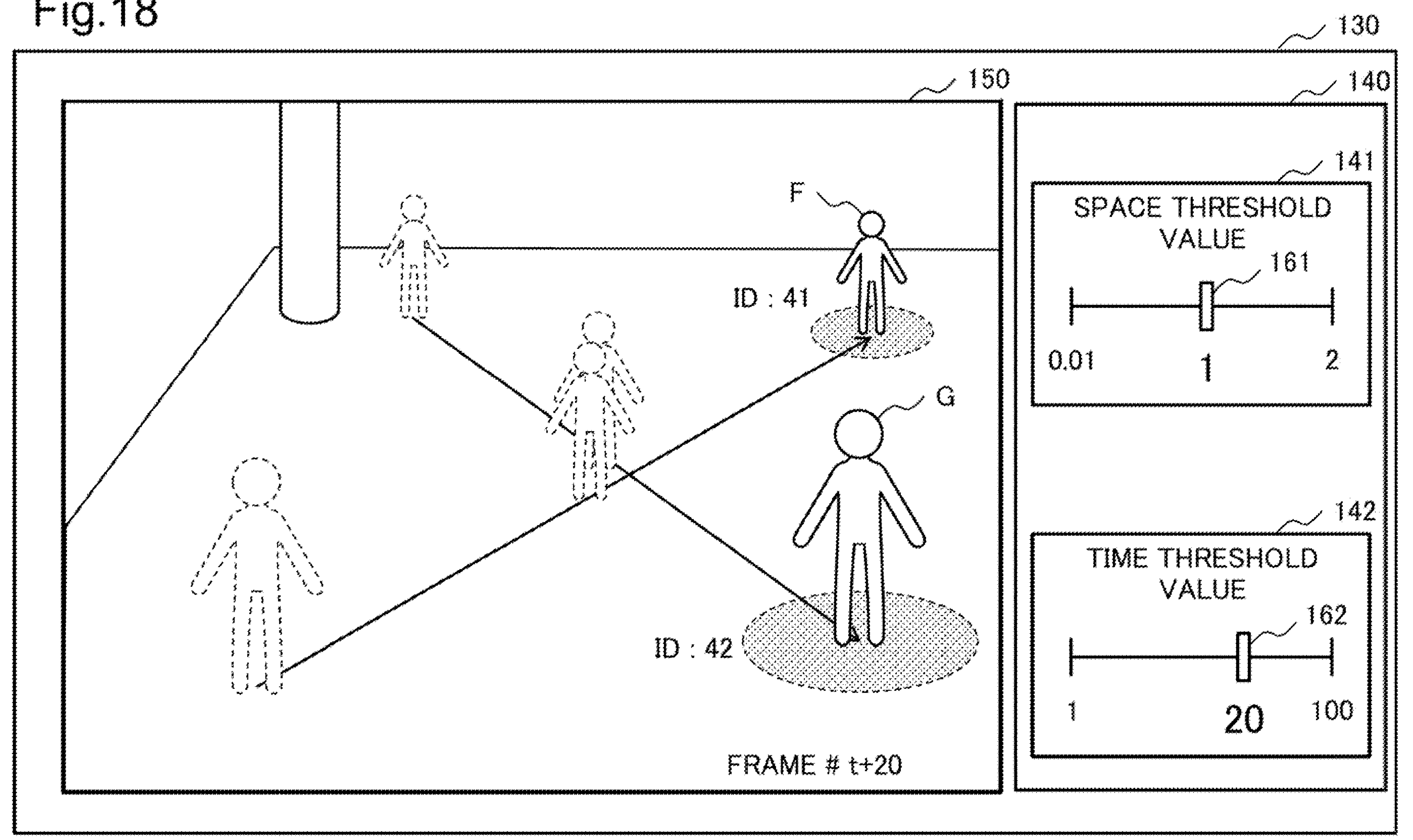
FIG. 18 is a conceptual diagram illustrating an example of display information displayed on the screen of the display equipment connected to the terminal device included in the tracking system according to the first example embodiment.

FIGS. 17 and 18 are conceptual diagrams for describing examples of adjusting the time threshold value according to the setting of the user in the examples of FIGS. 15 and 16. In the examples of FIGS. 15 and 16, the time threshold value is set to 10. On the other hand, in the examples of FIGS. 17 and 18, the time threshold value is set to 20.

In the image display area 150 of FIG. 17, the tracking image of the image frame with the frame number t is displayed. In the tracking image of the image frame with the frame number t, the identification number 41 is assigned to the tracking target F, and the identification number 42 is assigned to the tracking target G. In the image display area 150 of FIG. 18, the tracking image of the image frame with the frame number t+20 subsequent to the image frame with the frame number t is displayed. In the tracking image of the image frame with the frame number t+20, the identification number 41 is assigned to the tracking target F, and the identification number 42 is assigned to the tracking target G.

Thus, in a case where identification numbers are switched due to different tracking targets passing by each other in a series of image frames, the time threshold value, which is a temporal threshold value, is only required to be increased. Increasing the time threshold value increases the number of image frames used for tracking of the tracking target, therefore the flow line of the tracking target can be easily estimated, and the identification numbers are less likely to be switched between different tracking targets. When the time threshold value is excessively increased, the time required for collation of the tracking target becomes long. Therefore, in order to reduce the switching of the identification numbers due to the different tracking targets passing by each other, it is effective that the time threshold value can be adjusted to an optimum value according to the setting of the user as in the present example embodiment.

Figure 19:
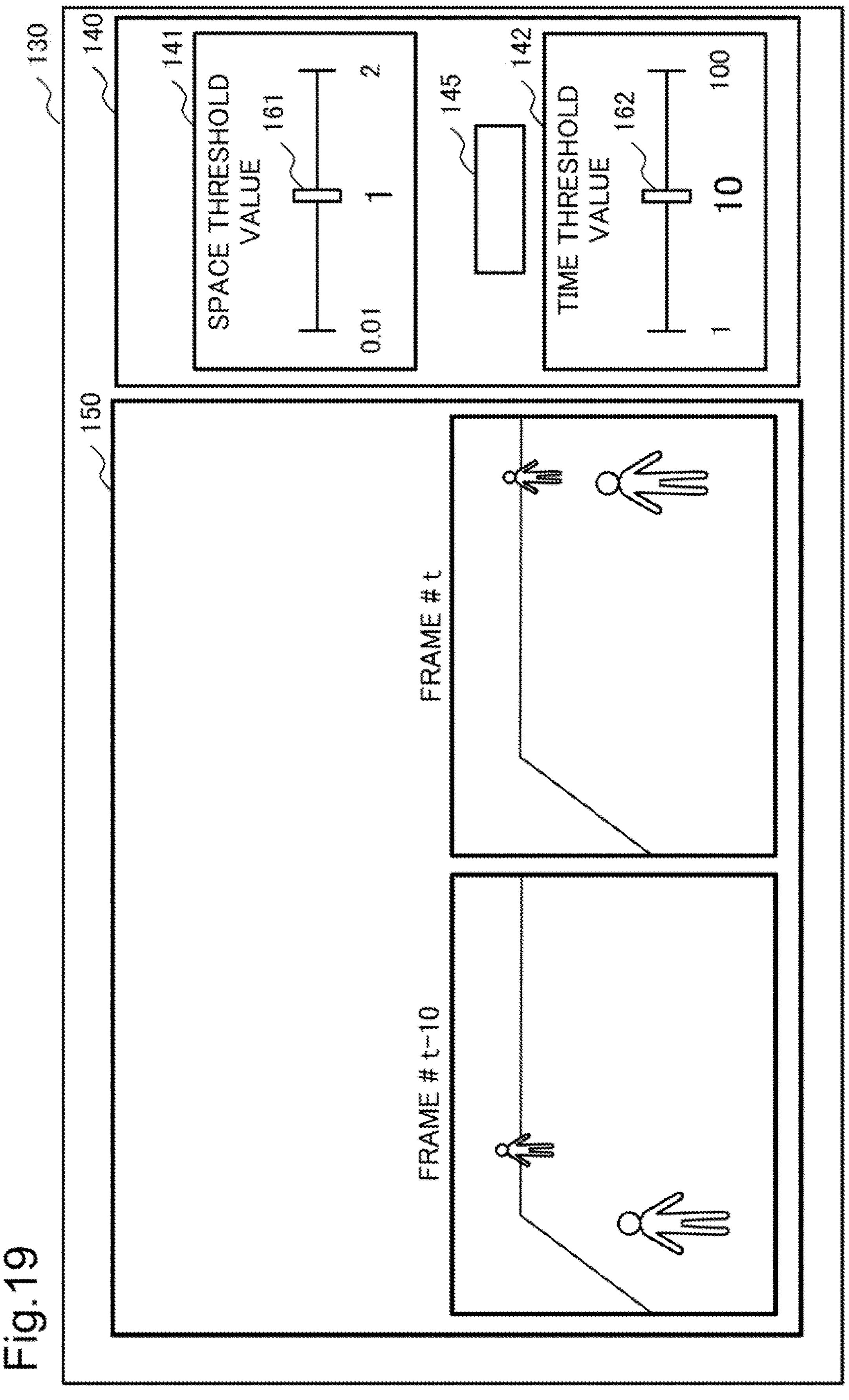
FIG. 19 is a conceptual diagram illustrating an example of display information displayed on the screen of the display equipment connected to the terminal device included in the tracking system according to the first example embodiment.

FIG. 19 illustrates an example in which an image frame (also referred to as comparison target image frame) in the past by the time threshold value with respect to the verification frame and the verification frame are displayed side by side in the image display area 150. In the example of FIG. 19, an image frame (frame number t-10) ten frames before the verification frame and the verification frame (frame number t) are displayed side by side in the image display area 150. In the example of FIG. 19, a button 145 for displaying the verification frame and the image frame of the collation target side by side in the image display area 150 is displayed in the threshold value setting area 140, and the display of the image display area 150 is switched in response to the user's operation on the button 145. The button 145 may be displayed at any position as long as it is on the screen of the display equipment 130. The operation for switching the display of the image display area 150 may be accepted by a portion other than the button 145, and may be accepted by a function key of the keyboard or the like.

The verification frame and the comparison target image frame may be displayed not horizontally but vertically or obliquely side by side in the image display area 150. The verification frame and the comparison target image frame may be superimposed and displayed in the image display area 150 in a state where the difference can be visually recognized. These frames may be superimposed and displayed in the image display area 150 such that the comparison target image frame is displayed in a blurred manner with respect to the verification frame, for example. A plurality of image frames at a plurality of times within the time set by the time threshold value may be displayed in the image display area 150 side by side with the verification frame. The display as in the image display area 150 in FIG. 19 allows the user to visually compare the images displayed side by side in the image display area 150, which assists the user in setting of the time threshold value.

(Operation)

Next, the operation of the tracking device 10 of the present example embodiment will be described with reference to the drawings. Here, processing of generating display information for each verification frame (display information generation processing) and processing of updating the threshold value in response to the user's operation (threshold value update processing) will be described.

[Display Information Generation Processing]

Figure 20:
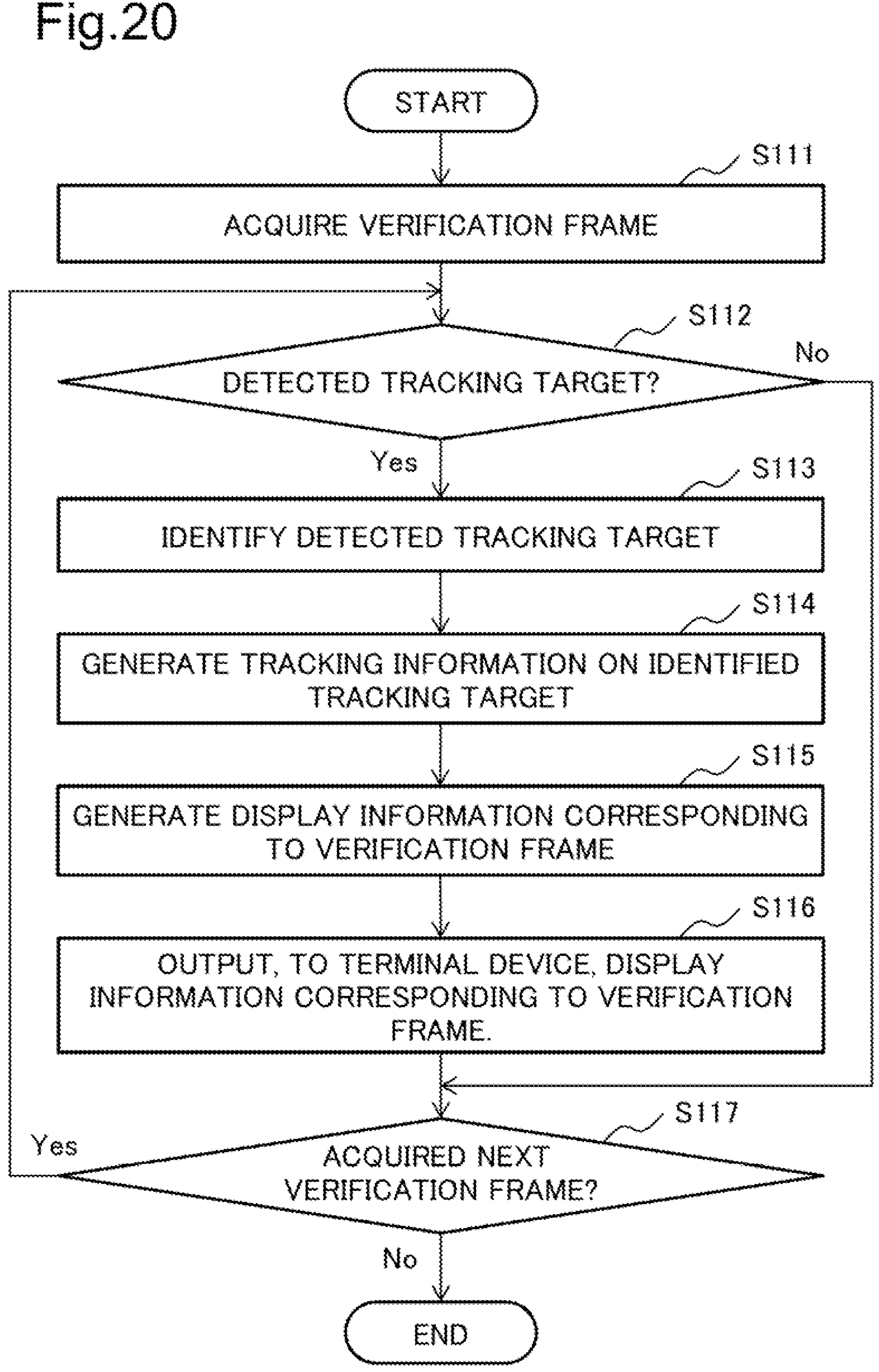
FIG. 20 is a flowchart illustrating an example of operation of a tracking device included in the tracking system according to the first example embodiment.

FIG. 20 is a flowchart for describing display information generation processing by the tracking device 10. In the processing along the flowchart of FIG. 20, the tracking device 10 serves as an agent of the operation.

In FIG. 20, first, the tracking device 10 acquires the verification frame (step S111).

Next, the tracking device 10 verifies the presence or absence of a tracking target in the acquired verification frame (step S112). If detecting the tracking target in the verification frame (Yes in step S112), the tracking device 10 identifies the detected tracking target (step S113). On the other hand, if not detecting the tracking target in the verification frame (No in step S112), the process proceeds to step S117.

Next to step S113, the tracking device 10 generates tracking information on the identified tracking target (step S114).

Next, the tracking device 10 generates display information corresponding to the verification frame (step S115).

Next, the tracking device 10 outputs the display information corresponding to the verification frame to the terminal device 120 (step S116).

Here, if the next verification frame is acquired (Yes in step S117), the process returns to step S112. On the other hand, if the next verification frame is not acquired (No in step S117), the processing along the flowchart of FIG. 20 ends. When the processing along the flowchart of FIG. 20 ends, the tracking device 10 enters a standby state until acquiring the next verification frame.

[Threshold Value Update Processing]

Figure 21:
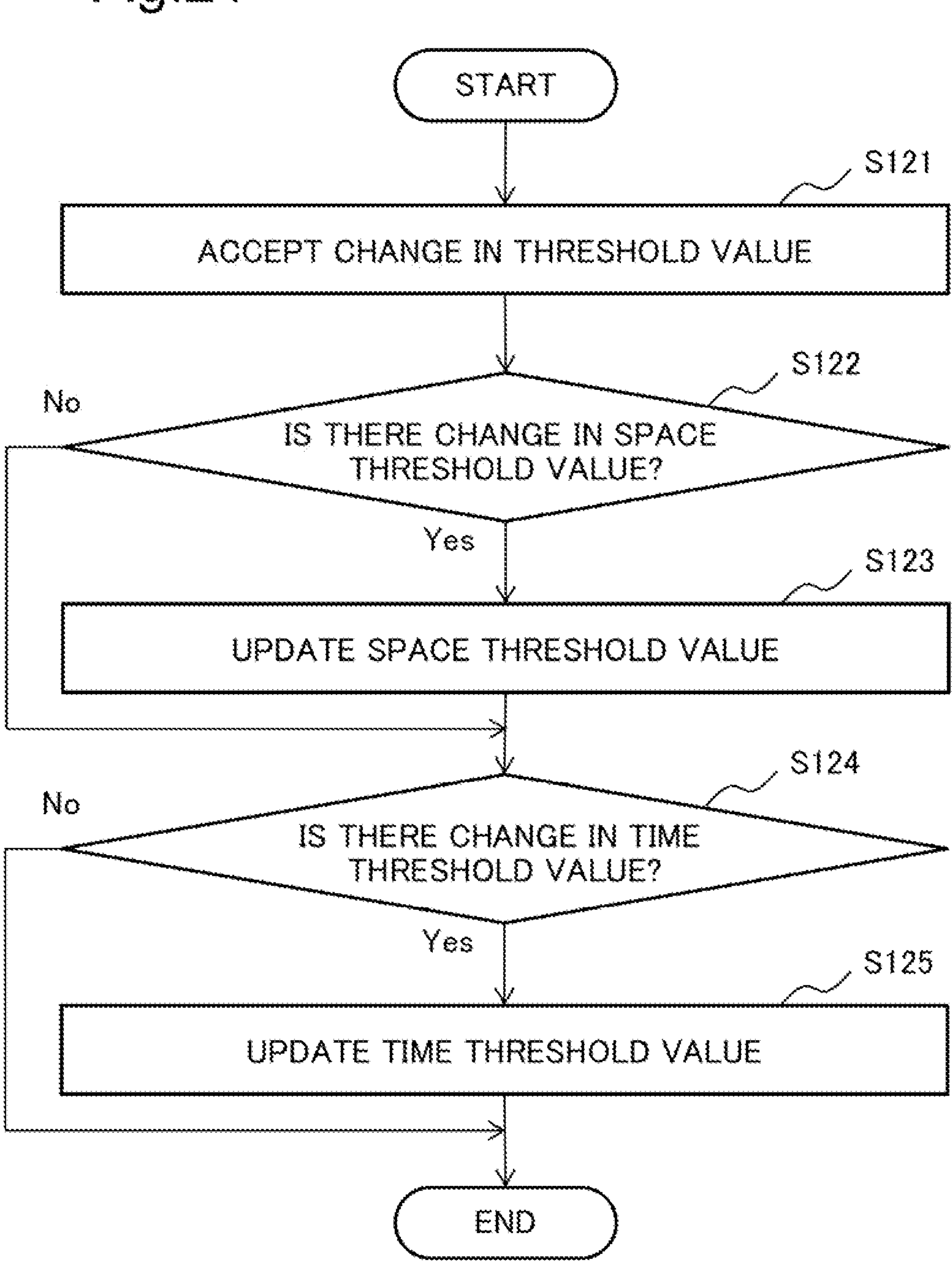
FIG. 21 is a flowchart illustrating an example of operation when the tracking device included in the tracking system according to the first example embodiment accepts a change in a threshold value.

FIG. 21 is a flowchart for describing threshold value change processing by the tracking device 10. In the processing along the flowchart of FIG. 21, the tracking device 10 serves as an agent of the operation. The following threshold value change processing may be commonly performed for a plurality of image frames constituting video data, or may be individually performed for each image frame.

In FIG. 21, first, the tracking device 10 accepts a change of the threshold value by the user via the terminal device 120 (step S121). Step S121 is a step of accepting an operation on the threshold value by the user, and there is a case where the threshold value is not changed.

If the space threshold value is change (Yes in step S122), the tracking device 10 updates the space threshold value with the value set by the user (step S123). If the space threshold value is not changed (No in step S122), the process proceeds to step S124.

If the time threshold value is changed (Yes in step S124), the tracking device 10 updates the time threshold value with the value set by the user (step S125). When the time threshold value is updated in step S125, the processing along the flowchart of FIG. 21 ends. On the other hand, if there is not a change in the time threshold value (No in step S124), the processing along the flowchart of FIG. 21 ends. When the processing along the flowchart of FIG. 21 ends, the tracking device 10 enters a standby state until accepting a change in the next threshold value.

As described above, the tracking system of the present example embodiment includes the tracking device, the surveillance camera, and the terminal device. The surveillance camera captures a surveillance target range and generates video data. The terminal device is connected to display equipment that has a screen for displaying the display information generated by the tracking device.

The tracking device includes the video acquisition unit, the video storage unit, the tracking unit, the display information generation unit, the display information output unit, and the threshold value update unit. The video acquisition unit acquires video data. The video storage unit stores the video data acquired by the video acquisition unit. The tracking unit extracts, from video data including a plurality of image frames, an image frame on the basis of the time threshold value, which is a reference for extracting a verification target image frame. The tracking unit detects the tracking target in the extracted image frame. The tracking unit sets a collation range for the tracking target on the basis of a space threshold value, which is a reference of the collation range for the tracking target. The display information generation unit generates display information including a tracking image in which the collation range is associated with the tracking target in an image frame, and an operation image for setting the time threshold value and the space threshold value. The display information output unit outputs, to the terminal device, the display information generated by the display information generation unit. The threshold value update unit acquires, from the terminal device, values of the time threshold value and the space threshold value set by the user who refers to the display information. The threshold value update unit updates the space threshold value and the time threshold value with the values set by the user.

In an aspect of the present example embodiment, the space threshold value is a value corresponding to a ratio based on the size of the tracking target in the image frame. In an aspect of the present example embodiment, the time threshold value is a value corresponding to the number of frames indicating how many frames of the image frames before the verification frame to use for collation with the verification frame, among the image frames constituting the video data.

In an aspect of the present example embodiment, the terminal device sets an image display area and a threshold value setting area on the screen of the display equipment. In the image display area, a tracking image in which the collation range is associated with the tracking target in the image frame is displayed. In the threshold value setting area, an operation image including a space threshold value setting area for setting the space threshold value and a time threshold value setting area for setting the time threshold value is displayed.

For example, the terminal device displays, in the space threshold value setting area, a first scroll bar for setting the space threshold value, and displays, in the time threshold value setting area, a second scroll bar for setting the time threshold value. The terminal device accepts an operation on the first scroll bar in the space threshold value setting area and an operation on the second scroll bar in the time threshold value setting area. The terminal device outputs, to the tracking device, the space threshold value and the time threshold value set in response to operations on the first scroll bar and the second scroll bar. For example, the terminal device displays, on the screen of the display equipment, the display information updated based on setting of the space threshold value and the time threshold value in the space threshold value setting area and the time threshold value setting area.

For example, the terminal device displays, on a screen of the display equipment, a button for displaying the image frame in a past by the time threshold value with respect to the verification frame and the verification frame side by side in the image display area. In response to an operation on the button, the terminal device displays the image frame in a past by the time threshold value with respect to the verification frame and the verification frame side by side in the image display area.

An appropriate spatial/temporal threshold value in collating the tracking target depends on an angle of view of a camera, a frame rate, presence or absence of an obstacle, and scenes such as a degree of congestion. The present example embodiment provides a GUI that enables the user to easily adjust a spatial/temporal threshold value depending on the scene. Therefore, according to the present example embodiment, since it is possible to change a spatial/temporal threshold value to an appropriate value in response to the setting by the user, it becomes possible to track a tracking target in accordance with the need of the user.

Second Example Embodiment

Next, the tracking device according to the second example embodiment will be described with reference to the drawings. The tracking device of the present example embodiment has a simplified configuration of the tracking device 10 of the first example embodiment.

FIG. 22 is a block diagram illustrating an example of the configuration of a tracking device 20 according to the present example embodiment. The tracking device 20 includes a tracking unit 23, a display information generation unit 24, and a threshold value update unit 26.

The tracking unit 23 extracts, from video data including a plurality of image frames, an image frame on the basis of a time threshold value that is a reference for extracting an image frame to be collated with a verification frame that is a verification target. The tracking unit 23 detects the tracking target in the extracted image frame. The tracking unit 23 sets a collation range for the tracking target on the basis of a space threshold value, which is a reference of the collation range for the tracking target.

The display information generation unit 24 generates display information including a tracking image in which the collation range is associated with the tracking target in an image frame, and an operation image for setting the time threshold value and the space threshold value.

The threshold value update unit 26 acquires values of the time threshold value and the space threshold value set by the user who refers to the display information. The threshold value update unit 26 updates the space threshold value and the time threshold value with the values set by the user.

As described above, the tracking device of the present example embodiment includes the tracking unit, the display information generation unit, and the threshold value update unit. The tracking unit extracts, from video data including a plurality of image frames, an image frame on the basis of a time threshold value that is a reference for extracting an image frame to be collated with a verification frame that is a verification target. The tracking unit detects the tracking target in the extracted image frame. The tracking unit sets a collation range for the tracking target on the basis of a space threshold value, which is a reference of the collation range for the tracking target. The display information generation unit generates display information including a tracking image in which the collation range is associated with the tracking target in an image frame, and an operation image for setting the time threshold value and the space threshold value. The threshold value update unit acquires values of the time threshold value and the space threshold value set by the user who refers to the display information. The threshold value update unit updates the space threshold value and the time threshold value with the values set by the user.

According to the present example embodiment, since it is possible to change a space threshold value and a time threshold value to appropriate values in response to the setting by the user, it is possible to track a tracking target in accordance with the need of the user.

(Hardware)

Here, a hardware configuration for achieving the tracking device and the terminal device according to each example embodiment of the present invention will be described using a computer 90 of FIG. 23 as an example. The computer 90 of FIG. 23 is a configuration example for achieving the tracking device and the terminal device of each example embodiment, and does not limit the scope of the present invention.

Figure 23:
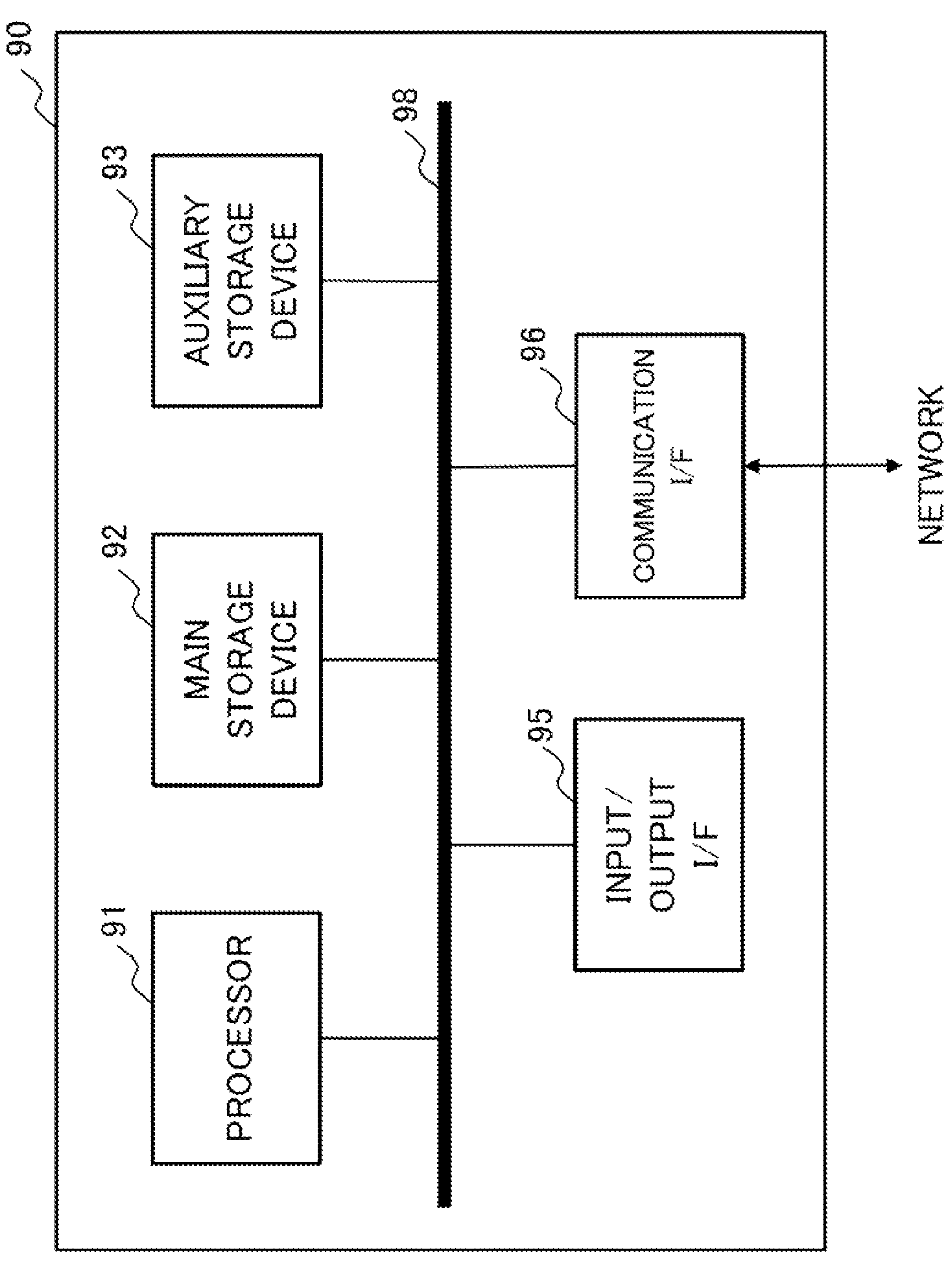
FIG. 23 is a block diagram illustrating an example of a hardware configuration of the tracking device, the terminal device, and the like according to each example embodiment.

As illustrated in FIG. 23, the computer 90 includes a processor 91, a main storage device 92, an auxiliary storage device 93, an input/output interface 95, and a communication interface 96. In FIG. 23, the interface is abbreviated as I/F. The processor 91, the main storage device 92, the auxiliary storage device 93, the input/output interface 95, and the communication interface 96 are connected to be capable of data communication with one another via a bus 98. The processor 91, the main storage device 92, the auxiliary storage device 93, and the input/output interface 95 are connected to a network such as the Internet or an intranet via the communication interface 96.

The processor 91 develops a program stored in the auxiliary storage device 93 or the like into the main storage device 92 and executes the developed program. The present example embodiment is only required to have a configuration using a software program installed in the computer 90.

The processor 91 executes processing by the tracking device or the terminal device of the present example embodiment.

The main storage device 92 has an area in which a program is developed. The main storage device 92 is only required to be a volatile memory such as a dynamic random access memory (DRAM). A nonvolatile memory such as a magnetoresistive random access memory (MRAM) may be configured as and added to the main storage device 92.

The auxiliary storage device 93 stores various data. The auxiliary storage device 93 includes a local disk such as a hard disk or a flash memory. Various data can be stored in the main storage device 92, and the auxiliary storage device 93 can be omitted.

The input/output interface 95 is an interface for connecting the computer 90 and peripheral equipment. The communication interface 96 is an interface for connecting to an external system and device through a network such as the Internet or an intranet on the basis of a standard or specifications. The input/output interface 95 and the communication interface 96 may be shared as an interface connected to external equipment.

Input equipment such as a keyboard, a mouse, or a touchscreen may be connected to the computer 90 as necessary. Those pieces of input equipment are used for input of information and settings. When the touchscreen is used as the input equipment, the screen of the display equipment is only required to also serve as the interface of the input equipment. Data communication between the processor 91 and the input equipment is only required to be mediated by the input/output interface 95.

The computer 90 may include display equipment for displaying information. In the case of including the display equipment, the computer 90 preferably includes a display control device (not illustrated) for controlling display of the display equipment. The display equipment is only required to be connected to the computer 90 via the input/output interface 95.

The above is an example of the hardware configuration for enabling the tracking device and the terminal device of each example embodiment. The hardware configuration of FIG. 23 is an example of a hardware configuration for achieving the tracking device and the terminal device of each example embodiment, and does not limit the scope of the present invention. A program for causing a computer to execute processing related to the tracking device and the terminal device of each example embodiment is also included in the scope of the present invention. A recording medium that records the program according to each example embodiment is also included in the scope of the present invention. The recording medium can be achieved by an optical recording medium such as a compact disc (CD) or a digital versatile disc (DVD), for example. The recording medium may be achieved by a semiconductor recording medium such as a universal serial bus (USB) memory or a secure digital (SD) card, a magnetic recording medium such as a flexible disk, or another recording medium. When the program executed by the processor is recorded in a recording medium, the recording medium corresponds to the recording medium.

Components of the tracking device and the terminal device of each example embodiment can be discretionarily combined. The components of the tracking device and the terminal device of each example embodiment may be achieved by software or may be achieved by a circuit.

While the present invention has been described with reference to the example embodiments, the present invention is not limited to the above example embodiments. Various changes that can be understood by those skilled in the art within the scope of the present invention can be made to the configuration and details of the present invention.

REFERENCE SIGNS LIST

1 tracking system
10, 20 tracking device
11 video acquisition unit
12 video storage unit
13, 23 tracking unit
14, 24 display information generation unit
15 display information output unit
16, 26 threshold value update unit
110 surveillance camera
120 terminal device
121 display information acquisition unit
122 display information storage unit
123 display unit
124 input unit
127 input equipment
130 display equipment

The invention claimed is:

1. A tracking device comprising:

at least one memory storing instructions; and at least one processor connected to the at least one memory and configured to execute the instructions to:

generate a graphical user interface to be displayed on a display device, the graphical user interface comprising:

an image display area configured to display a tracking image in which a collation range is associated with a tracking target detected in image frames, the collation range being set based on a space threshold value that is a reference of the collation range for the tracking target; and a threshold value setting area configured to display an operation image to set the space threshold value and a time threshold value, the time threshold value being a reference for extracting the image frames to be collated with a verification frame that is a verification target;

receive updated values of the time threshold value and the space threshold value, based on operation on the operation image by a user; and update, the space threshold value and the time threshold value with the updated values set by the user.

2. The tracking device according to claim 1, wherein the at least one processor is further configured to execute the instructions to:

display, in the threshold value setting area:

a first scroll bar for setting the space threshold value, the first scroll bar having a first knob movable between a minimum value and a maximum value; and a second scroll bar for setting the time threshold value, the second scroll bar having a second knob movable between a minimum value and a maximum value.

3. The tracking device according to claim 2, wherein the at least one processor is further configured to execute the instructions to:

display, below the first knob, a numerical value of the space threshold value that is set; and display, below the second knob, a numerical value of the time threshold value that is set.

4. The tracking device according to claim 1, wherein the at least one processor is further configured to execute the instructions to:

display, in the image display area, the collation range as a predetermined shape, the collation range being set centered on the tracking target, wherein a size of the collation range is changed according to a size of the tracking target in the image frames.

5. The tracking device according to claim 1, wherein the at least one processor is further configured to execute the instructions to:

in a case where at least one of the space threshold value and the time threshold value is updated, change a size of the collation range in the tracking image displayed in the image display area, or a range of the image frames to be collated with the verification frame, based on the updated space threshold value or time threshold value.

6. The tracking device according to claim 1, wherein the at least one processor is further configured to execute the instructions to:

receive an input by the user for selecting a first tracking target among a plurality of tracking targets displayed in the image display area; and change the space threshold value only for the first tracking target.

7. The tracking device according to claim 6, wherein the at least one processor is further configured to execute the instructions to:

hide, in the image display area, the collation range corresponding to tracking targets other than the first tracking target selected by the user.

8. The tracking device according to claim 1, wherein the space threshold value indicates a ratio based on a height of the tracking target in the image frames, and wherein the at least one processor is further configured to execute the instructions to:

determine a size of the collation range by calculating based on the height of the tracking target and the space threshold value.

9. The tracking device according to claim 1, wherein the time threshold value is a value corresponding to a number of the image frames, among a plurality of the image frames included in a video data, to be used for collation with the verification frame.

10. The tracking device according to claim 1, wherein the at least one processor is further configured to execute the instructions to:

update the space threshold value and the time threshold value for all the image frames constituting video data.

11. A tracking method executed by a computer, the tracking method comprising:

generating a graphical user interface to be displayed on a display device;

displaying, on an image display area of the graphical user interface, a tracking image in which a collation range is associated with a tracking target detected in image frames, the collation range being set based on a space threshold value that is a reference of the collation range for the tracking target;

displaying, a threshold value setting area that displays an operation image to set the space threshold value and a time threshold value, the time threshold value being a reference for extracting the image frames to be collated with a verification frame that is a verification target;

receiving updated values of the time threshold value and the space threshold value, based on operation on the operation image by a user; and updating the space threshold value and the time threshold value with the updated values set by the user.

12. The tracking method of claim 11, further comprising:

displaying, in the threshold value setting area:

a first scroll bar for setting the space threshold value, the first scroll bar having a first knob movable between a minimum value and a maximum value; and a second scroll bar for setting the time threshold value, the second scroll bar having a second knob movable between a minimum value and a maximum value.

13. The tracking method of claim 11, further comprising:

displaying, in the image display area, the collation range as a predetermined shape, the collation range being set centered on the tracking target, wherein a size of the collation range is changed according to a size of the tracking target in the image frames.

14. The tracking method of claim 11, further comprising:

in a case where at least one of the space threshold value and the time threshold value is updated, changing a size of the collation range in the tracking image displayed in the image display area, or a range of the image frames to be collated with the verification frame, based on the updated space threshold value or time threshold value.

15. The tracking method of claim 11, further comprising:

updating the space threshold value and the time threshold value for all the image frames constituting video data.

16. A non-transitory recording medium that records a program that causes a computer to execute:

processing of generating a graphical user interface to be displayed on a display device;

processing of displaying, on an image display area of the graphical user interface, a tracking image in which a collation range is associated with a tracking target detected in image frames, the collation range being set based on a space threshold value that is a reference of the collation range for the tracking target;

processing of displaying a threshold value setting area that displays an operation image to set the space threshold value and a time threshold value, the time threshold value being a reference for extracting the image frames to be collated with a verification frame that is a verification target;

processing of receiving updated values of the time threshold value and the space threshold value, based on operation on the operation image by a user; and processing of updating the space threshold value and the time threshold value with the updated values set by the user.

17. The non-transitory recording medium of claim 16, which further causes the computer to execute:

displaying, in the threshold value setting area:

a first scroll bar for setting the space threshold value, the first scroll bar having a first knob movable between a minimum value and a maximum value; and a second scroll bar for setting the time threshold value, the second scroll bar having a second knob movable between a minimum value and a maximum value.

18. The non-transitory recording medium of claim 16, which further causes the computer to execute:

displaying, in the image display area, the collation range as a predetermined shape, the collation range being set centered on the tracking target, wherein a size of the collation range is changed according to a size of the tracking target in the image frames.

19. The non-transitory recording medium of claim 16, which further causes the computer to execute:

in a case where at least one of the space threshold value and the time threshold value is updated, changing a size of the collation range in the tracking image displayed in the image display area, or a range of the image frames to be collated with the verification frame, based on the updated space threshold value or time threshold value.

20. The non-transitory recording medium of claim 16, which further causes the computer to execute:

updating the space threshold value and the time threshold value for all the image frames constituting video data.

* * * * *